(12) United States Patent
Urakawa et al.

(10) Patent No.: US 8,159,705 B2
(45) Date of Patent: Apr. 17, 2012

(54) COMMUNICATION DEVICE AND STORAGE MEDIUM STORING CONTROL PROGRAM FOR COMMUNICATION DEVICE

(75) Inventors: Yutaka Urakawa, Nagoya (JP); Toshiro Haze, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 793 days.

(21) Appl. No.: 12/185,765

(22) Filed: Aug. 4, 2008

(65) Prior Publication Data
US 2009/0033994 A1  Feb. 5, 2009

(30) Foreign Application Priority Data
Aug. 2, 2007  (JP) ................... 2007-201741

(51) Int. Cl.
*G06F 3/12* (2006.01)
(52) U.S. Cl. ............ 358/1.15; 358/1.13; 358/1.14; 358/1.16
(58) Field of Classification Search .......... 358/1.14, 358/1.12, 1.16, 453
See application file for complete search history.

(56) References Cited

U.S. PATENT DOCUMENTS

| | | | | |
|---|---|---|---|---|
| 6,827,279 B2* | 12/2004 | Teraura | ............... | 235/492 |
| 7,140,534 B2* | 11/2006 | Miyazawa et al. | ........ | 235/375 |
| 7,428,067 B2* | 9/2008 | Kiwada | ............... | 358/1.14 |
| 7,450,253 B2* | 11/2008 | Kiwada | ............... | 358/1.14 |
| 2002/0170973 A1 | 11/2002 | Teraura | | |
| 2005/0105140 A1* | 5/2005 | Ozaki | ............... | 358/402 |
| 2006/0176510 A1 | 8/2006 | Nishizawa | | |
| 2006/0215228 A1* | 9/2006 | Inaba | ............... | 358/3.28 |
| 2008/0144831 A1* | 6/2008 | Sparrell | ............... | 380/277 |

FOREIGN PATENT DOCUMENTS

| | | |
|---|---|---|
| JP | H05-153297 A | 6/1993 |
| JP | 2002-337426 A | 11/2002 |
| JP | 2006217298 A | 8/2006 |

OTHER PUBLICATIONS

Japan Patent Office, Office Action for Japanese Patent Application No. 2007-201741 (counterpart to above-captioned patent application), mailed Sep. 6, 2011.

* cited by examiner

*Primary Examiner* — Chan Park
(74) *Attorney, Agent, or Firm* — Baker Botts L.L.P.

(57) ABSTRACT

A communication device includes a receiving unit, a printing unit, a writing unit, and a control unit. The receiving unit receives incoming data including first image data created based on a first image on a document and additional data indicating transmitting source of the first image data. The control unit controls the printing unit to print on a first recording paper a second image based on the first image data and controls the writing unit to write the additional data in a wireless tag provided on the first recording paper.

11 Claims, 15 Drawing Sheets

FIG.9A

COPY SETTING

| IMAGE QUALITY | STANDARD |
| READ ADDITIONAL DATA | OFF |
| MAGNIFY/REDUCE | 80% |
| RECORDING PAPER | A4 |

FIG.9B

COPY SETTING

| IMAGE QUALITY | STANDARD |
| READ ADDITIONAL DATA | ON |
| PRINT POSITION | UPPER LEFT |
| PRINT SIZE | 10pt |

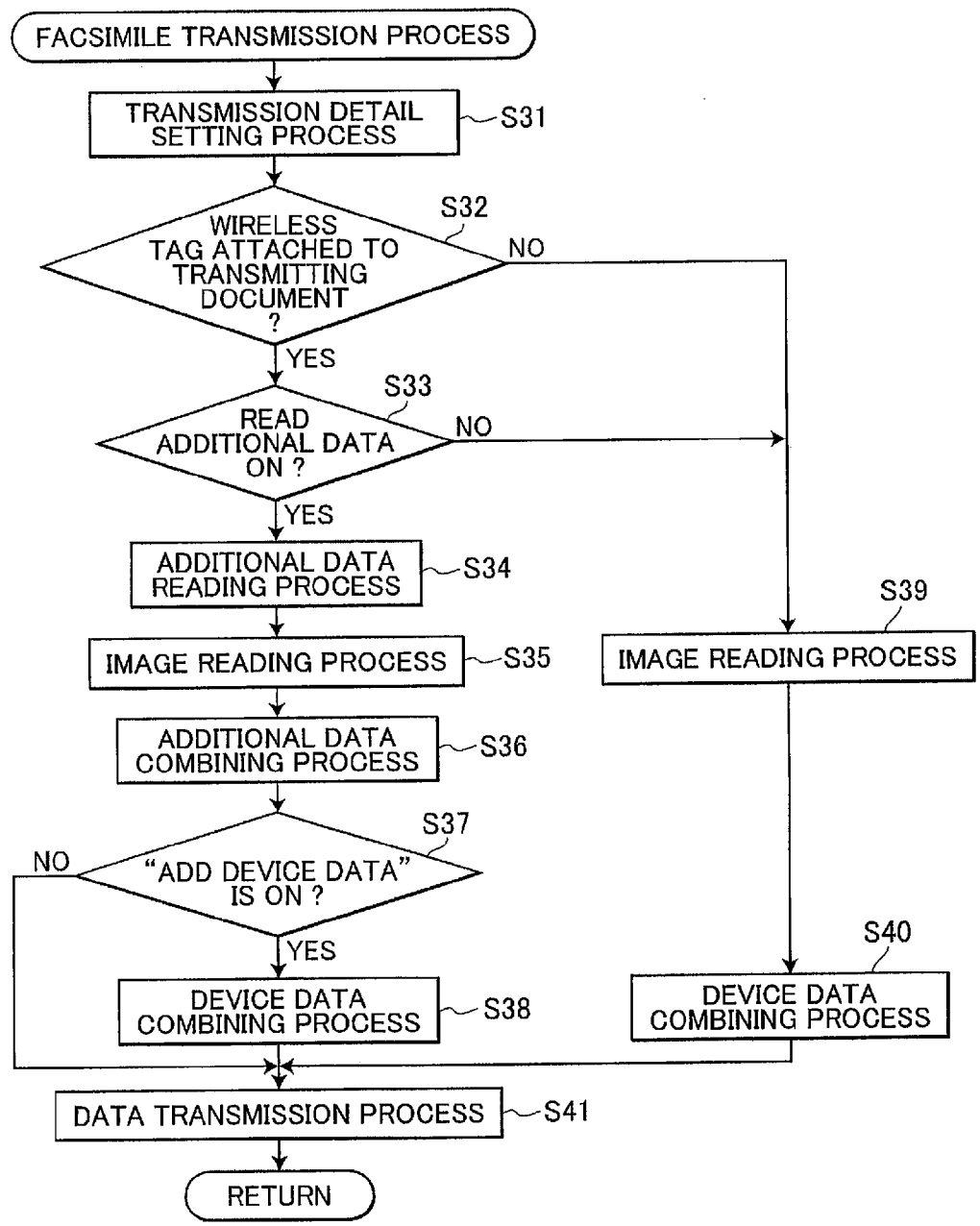

FIG.12A

FACSIMILE TRANSMISSION SETTING

| IMAGE QUALITY | STANDARD |
| READ ADDITIONAL DATA | OFF |
| MAGNIFY/REDUCE | 100% |
| RECORDING SHEET | A4 |

FIG.12B

FACSIMILE TRANSMISSION SETTING

| IMAGE QUALITY | STANDARD |
| READ ADDITIONAL DATA | ON |
| ADD DEVICE DATA | ON |
| MAGNIFY/REDUCE | 100% |

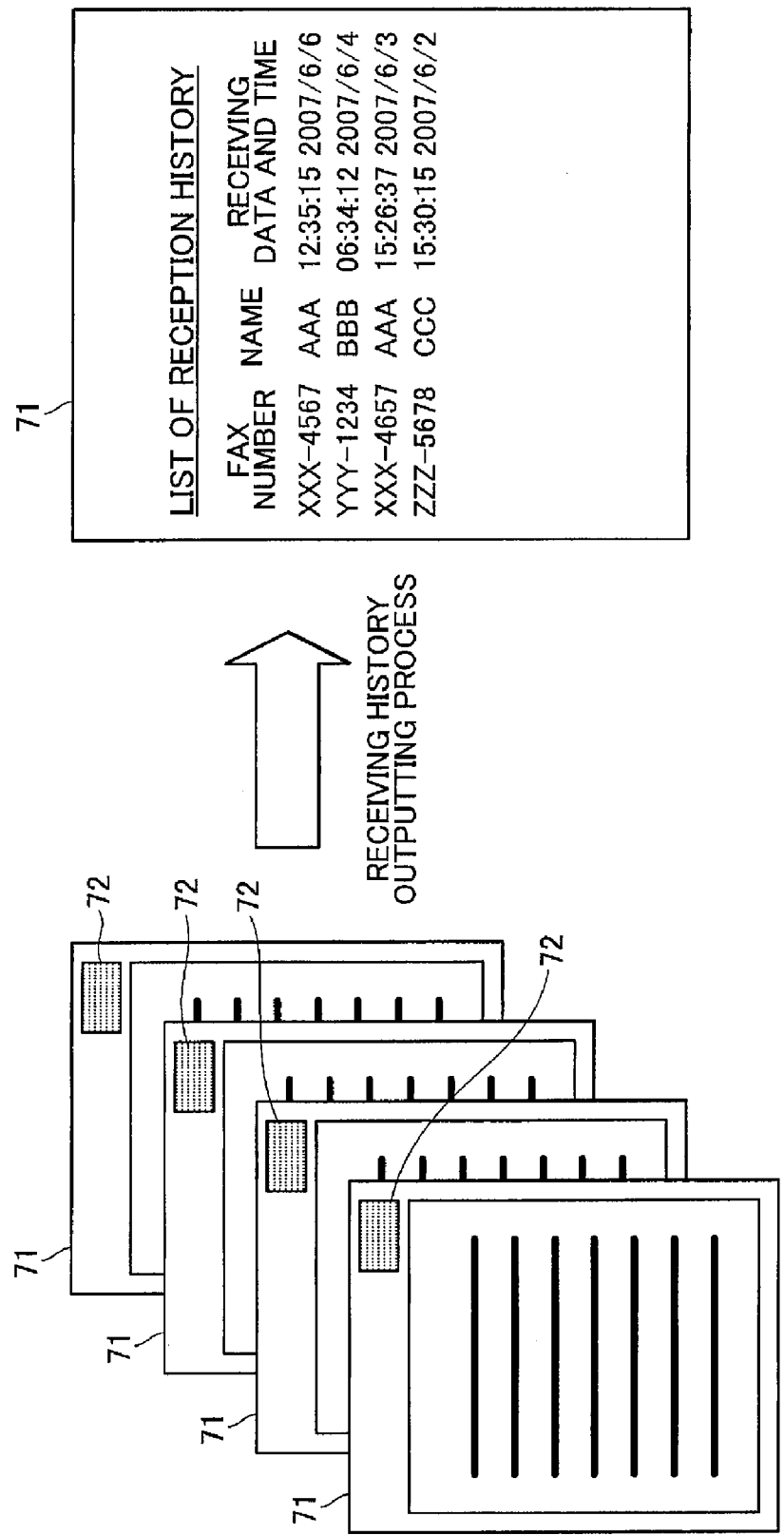

COMMUNICATION DEVICE AND STORAGE MEDIUM STORING CONTROL PROGRAM FOR COMMUNICATION DEVICE

CROSS REFERENCE TO RELATED APPLICATION

The present application claims priority from Japanese patent application No. 2007-201741 filed Aug. 2, 2007. The entire content of the priority application is incorporated herein by reference.

TECHNICAL FIELD

The present invention relates to a communication device and a storage medium storing a control program for the communication device that can receive data including image data of a document and additional data representing a transmitting source of the image data. More particularly, the invention relates to a communication device that can appropriately process the received additional data.

BACKGROUND

Generally, communication devices (e.g., facsimile devices) that transmit and receive image data for any document are configured to transmit the image data together with additional data that represents the transmitting source from which the image data has been transmitted.

A communication device (i.e., receiving-side communication device) is configured to output not only the image data, but also the additional data, on a recording paper, upon receiving the image data and the additional data.

The user of the receiving-side communication device may not want to output the additional data. (That is, the user may desire to output only the image data.) Japanese Patent Application Publication No. H05-153297 discloses that a communication device (facsimile device) that can meet this user's desire.

The facsimile device in Japanese Patent Application Publication No. H05-153297 receives an initial identification signal from the receiving-side communication device, before transmitting data. The facsimile device, which is the data transmitting device (i.e., transmitting source), analyzes the initial identification signal and determines whether the receiving-side communication device is demanding the transmission of the additional data. Based on the result of the analysis (that is, in accordance with whether the receiving side is requesting for the additional data), the facsimile device determines whether transmitting data contains the additional data, and then transmits the transmitting data to the receiving-side communication device.

According to the invention disclosed in Japanese Patent Application Publication No. H05-153297, the receiving-side communication device can print the additional data and the image data on a recording paper, upon receiving the data containing the additional data, and can print the received data without the additional data on a recording paper, upon receiving the data containing no additional data. That is, the receiving-side communication device outputs or does not output the additional data, in accordance with the initial identification signal.

SUMMARY

As described above, the facsimile device disclosed in Japanese Patent Application Publication No. H05-153297 does not transmit "the additional data" to a destination device if the received initial identification signal indicates that "the user does not desire the additional data to be transmitted". The receiving-side communication device (the destination device) therefore has no "additional data" concerning the data communication. Hence, in the invention described in Japanese Patent Application Publication No. H05-153297, the receiving-side communication device does not need to receive "the additional data identifying the transmitting source device" at the time of receiving data, but cannot use the additional data later, when necessary, (in order to identify, for example, the "transmission source of data" and "date and time of data transmission and reception").

In the invention disclosed in Japanese Patent Application Publication No. H05-153297, whether "the additional data has been transmitted" is determined from the content of the initial identification signal prior to receiving the data transmission and reception. Therefore, the "presence or absence of the additional data" can hardly set every time the data is transmitted and received. Hence, if the receiving-side communication device has been set to transmit the initial identification signal indicating that "the additional data need not be output," the receiving-side communication device does not receive the additional data, though the additional data should necessarily be output. In this case, the additional data cannot be output later. Consequently, the receiving-side communication device cannot use the additional data when the additional data is necessary.

Unless the transmitting source device is the facsimile device disclosed in Japanese Patent Application Publication No. H05-153297, the receiving-side communication device cannot select either "the transmission of the additional data" or "no transmission of the additional data." That is, even if the receiving-side communication device transmits "the initial identification signal based on a desirable setting" to a transmitting source device, the additional data will be transmitted regardless of "the initial identification signal" if the facsimile device cannot recognize "the initial identification signal." As a result, the transmitting source device may transmit data different from the data desired at the receiving-side communication device, as to whether or not the data should include the additional data.

In view of the foregoing, the present invention has been made in order to solve the problems with the conventional technique. It is an object of the present invention to provide a communication device that is capable of receiving data including image data based on a document and additional data indicating transmitting source device from which the image data has been transmitted, and also a storage medium storing a control program for controlling the communication device. More particularly, the object of the present invention is to provide the communications device and the storage medium storing the control program, which can appropriately process the received additional data and which are more useful than conventional device and program.

To achieve the above and other objects, one aspect of the invention provides a communication device including a receiving unit, a printing unit, a writing unit, and a control unit. The receiving unit receives incoming data including first image data created based on a first image on a document and additional data indicating transmitting source of the first image data. The control unit controls the printing unit to print on a first recording paper a second image based on the first image data and controls the writing unit to write the additional data in a wireless tag provided on the first recording paper.

In another aspect of the present invention, there is provided a computer readable storage medium storing a computer-executable control program for a communication device. The communication device includes a receiving unit that receives incoming data including first image data created based on a first image on a document and additional data indicating transmitting source of the image data; a printing unit; and a writing unit. The control program includes:

instructions for controlling the printing unit to print on a first recording paper the second image based on the first image data; and instructions for controlling the writing unit to write the additional data in a wireless tag provided on the first recording paper.

BRIEF DESCRIPTION OF THE DRAWINGS

In the drawings:

FIGS. 9A and 9B show copy setting screens displayed on the LCD according to the embodiment;

FIG. 11 is a flowchart illustrating steps in a facsimile transmission process program according to the embodiment;

FIGS. 12A and 12B show a facsimile transmission setting screens displayed on the LCD according to the embodiment;

FIG. 15 is a diagram outlining a receiving history outputting process according to the embodiment.

DETAILED DESCRIPTION

Figure 1:
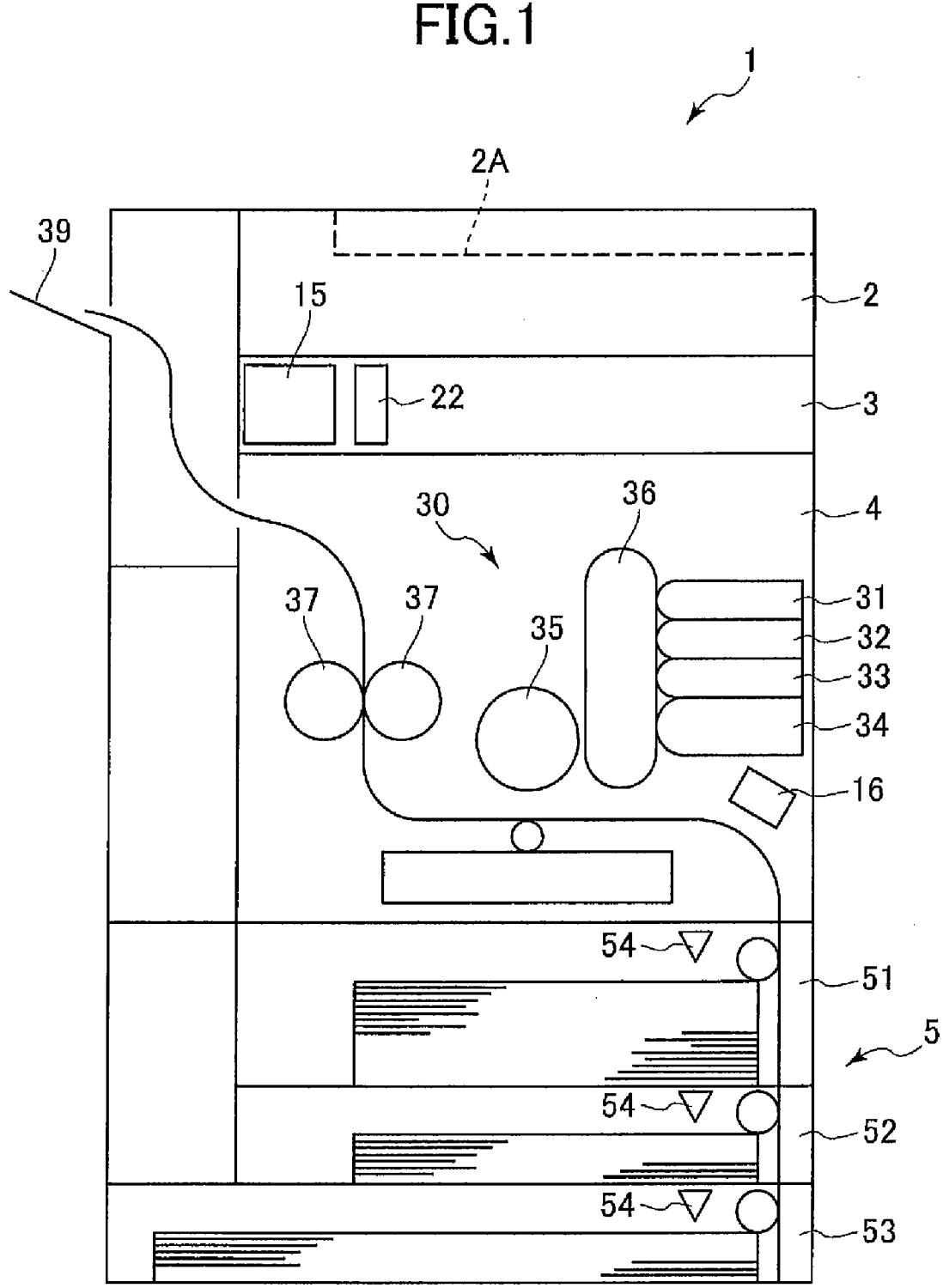
FIG. 1 is a schematic cross-sectional view of a configuration of a facsimile device according to an embodiment of the present invention.

Next, a communication device according to an embodiment of the present invention will be described with reference to the accompanying drawings. In this embodiment, the communication device is applied to a facsimile device. FIG. 1 is a cross-sectional view schematically showing the configuration of the facsimile device.

As shown in FIG. 1, the facsimile device 1 includes an automatic document feeder 2, a scanner unit 3, a printer unit 4, and a paper feed tray unit 5.

The automatic document feeder 2 has a document mount unit 2A. Documents to be sent by facsimile are placed on the document mount unit 2A. When the user pushes a start key (not shown), the documents are transported one by one, to the scanner unit 3. The scanner unit 3 reads image data printed on each document. When the scanner unit 3 finishes reading the image data, each of the documents is ejected from facsimile device 1 through a document-ejecting port (not shown).

The scanner unit 3 has a wireless tag reader 15 and a scanner 22. If a wireless tag 72 (see FIG. 3) is attached to the document fed from the automatic document feeder 2, the wireless tag reader 15 reads data from the wireless tag 72 of the document by radio wave. The scanner 22 reads the image data printed on the document fed from the automatic document feeder 2, no matter whether or not the wireless tag 72 is attached to the document. The wireless tag 72 is an IC tag or a RAFID (Radio Frequency Identification) tag that is capable of reading and writing data in a contactless state.

The printer unit 4 has a wireless tag writer 16 and a laser printer 30. The wireless tag writer 16 writes, by radio wave, data (e.g., additional data, which will be described later) in the wireless tag 72 that is attached to a recording paper, which has been fed from the paper feed tray unit 5.

The laser printer 30 has a Y-station 31, an M-station 32, a C-station 33, and a K-station 34. The Y-station 31, the M-station 32, the C-station 33, and the K-station 34 accommodate a yellow toner, a magenta toner, a cyan toner, and a black toner, respectively. The laser printer 30 further has a transfer drum 35, an intermediate transfer belt 36 and an image-fixing roller 37. The intermediate transfer belt 36 transfers toners from the stations 31 to 34 to the transfer drum 35. The laser printer 30 can therefore form an image on the recording paper. The recording paper, on which the image data has been printed, is ejected onto an ejected-paper stacker 39.

The paper feed tray unit 5 includes a first paper feed tray 51, a second paper feed tray 52, and a third paper feed tray 53. Each of the sheet feed trays 51 to 53 accommodates a recording paper with the wireless tag 72 and a recording paper without the wireless tag 72. Each of the paper feed trays 51 to 53 each has a detection sensor 54. The detection sensor 54 detects whether or not the uppermost recording paper stored in the associated sheet feed tray 51, 52 or 53 has the wireless tag 72.

Figure 2:
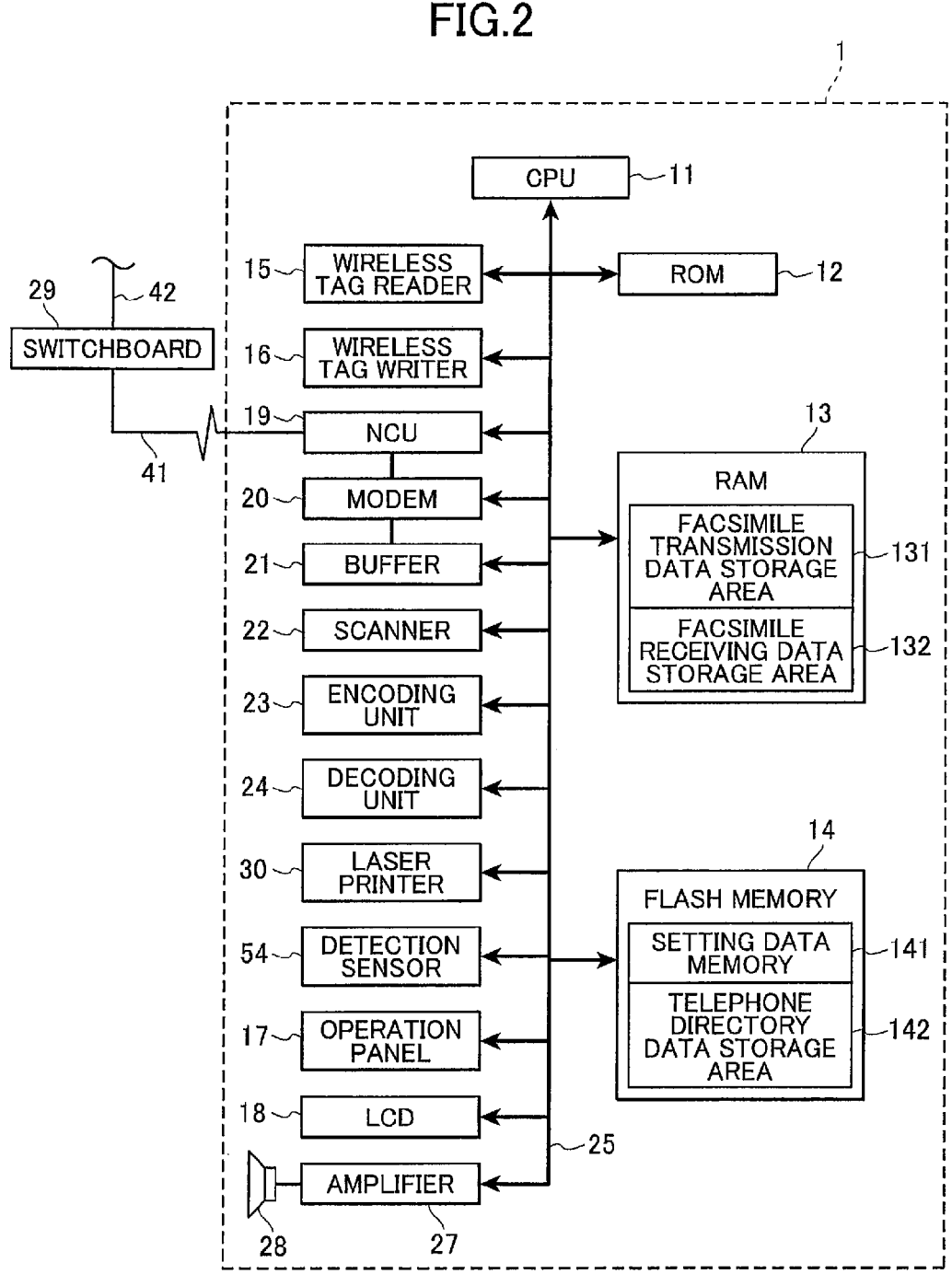
FIG. 2 is a block diagram showing a configuration of a control system of the facsimile device.

Next, the configuration of a control system of the facsimile device 1 according to this embodiment will be described with reference to FIG. 2. FIG. 2 is a block diagram showing the configuration of the control system of the facsimile device 1.

The facsimile device 1 includes a CPU 11, a ROM 12, a RAM 13, and a flash memory 14. These components and various peripheral devices, for example, the network control unit (hereinafter referred as NCU) 19 are connected with one another through a bus line 25. The NCU performs line control.

The CPU 11 receives and transmits various signals, via the NCU 19, from and to the devices connected to the CPU 11 through the bus line 25, thus performing facsimile operation, i.e., data communication. The ROM 12 is an unrewritable memory and stores control programs which will be described later, i.e., a facsimile receiving process program (see FIG. 5), a routine process program (see FIG. 6), a copy process program (see FIG. 8), a facsimile transmission process program (see FIG. 11), a receiving history outputting process program (see FIG. 14)

The RAM 13 is a memory that temporarily stores various data, while the facsimile device 1 is performing operations. The RAM 13 has a facsimile transmission data storage area 131 and a facsimile receiving data storage area 132.

The facsimile transmission data storage area 131 stores facsimile data 63. The facsimile data 63 is composed of image data on the document read by the scanner 22, and additional data read by the wireless tag reader 15 from the wireless tags 72 attached to the document.

Note that, the facsimile transmission data storage area 131 is used in the image editing process described in the copy process program, the facsimile transmission process program, and the receiving history outputting process program, respectively. The structure of the facsimile data 63 will be later described in detail with reference to the drawings.

The facsimile receiving data storage area 132 temporarily stores received facsimile data 63. The facsimile receiving data storage area 132 is used to edit the image data when the facsimile receiving process program is executed.

The flash memory 14 is a nonvolatile memory in which data is rewritable. The flash memory 14 has a setting data memory 141 and a telephone directory data storage area 142.

The setting data memory 141 stores various setting data sets, such as wireless tag record setting data, copy setting data, and facsimile transmission setting data. The wireless tag record setting data is used when the facsimile receiving process program is executed. The copy setting data is used when the copy process program is executed. The facsimile transmission setting data is used when the facsimile transmission process program is executed.

The wireless tag record setting data indicates whether the additional data included in the facsimile data 63 should be recorded in the wireless tag 72 on the recording sheet. The wireless tag record setting data is set "record setting" if the additional data needs to be recorded in the wireless tag 72. The "record setting" will be described later.

The copy setting data contains various copy detail setting data sets. Similarly, the facsimile transmission setting data contains various facsimile transmission detail setting data sets. The copy detail setting data sets and the facsimile transmission detail setting data sets will be described later in detail.

The telephone directory data storage area 142 stores a plurality of sets of transmitting source data (i.e., telephone number and facsimile number) that can identify a plurality of destination devices (e.g., a transmitting source device 60 (see FIG. 3)), respectively. In the telephone directory data storage area 142, the transmitting source data sets (i.e., telephone number and facsimile number) are stored in one to one correspondence with the names of the transmitting source devices as shown in FIG. 7B. The facsimile device 1 can make a call to one of the destination devices, by using one of the transmitting source data sets, in order to achieve a facsimile transmission or a telephone call.

As shown in FIG. 2, the facsimile device 1 includes an operation panel 17, an LCD 18, a modem 20, a buffer 21, an encoding unit 23, a decoding unit 24 and an amplifier 27, in addition to the wireless tag reader 15, wireless tag writer 16, NCU 19, scanner 22, laser printer 30 and detection sensor 54. These peripheral devices are connected to one another through the bus line 25.

As stated above, the wireless tag reader 15 is capable of reading wireless tag data stored in the wireless tag 72 attached to the document. The wireless tag writer 16 is capable of writing the wireless tag data in the wireless tag 72 attached to the recording paper.

The NCU 19 performs the communication control, such as connecting the line to a switchboard 29 and disconnecting the line from the switchboard 29. The modem 20 modulates or demodulates the facsimile data 63 and transmits the modulated or demodulated facsimile data 63. The modem 20 also transmits and receives various proceeding signals for transmission control. The buffer 21 temporarily stores encoded facsimile data that is received from and transmits to the destination devices.

As described above, the scanner 22 is a component of the automatic document feeder 2 and reads data from the documents, one by one, fed from the document mount unit 2A, thereby creating image data for each page of the documents. The image data read by the scanner 22 is stored in the facsimile transmission data storage area 131 and then edited under a prescribed condition.

The encoding unit 23 encodes the facsimile data 63 when transmitting the facsimile data 63. The decoding unit 24 reads received image data (encoded facsimile data) stored in the buffer 21 and decodes this image data.

As described above, the laser printer 30 prints the image data decoded by the decoding unit 24, on a recording paper supplied from any one of the sheet feed trays 51, 52 and 53.

The detection sensors 54 are arranged at the first, second and third sheet feeding trays 51, 52 and 53, respectively. Each detection sensor 54 detects whether or not the uppermost recording paper stored in the associated sheet feed tray 51, 52 or 53 has a wireless tag 72.

The operation panel 17 is an operating portion having a plurality of number keys and some keys including the above-mentioned start key. When any one of the keys constituting the operation panel 17 is operated, an input signal is transmitted to the CPU 11. The CPU 11 performs a control in accordance with the input signal. The operation panel 17 is used, for example, to input a destination number for the facsimile transmission (i.e., facsimile number) or to select "copy mode," "facsimile transmission mode," or "receiving history outputting mode."

The LCD 18 is composed of a liquid crystal display. The LCD 18 can display various screens for showing data sets of the facsimile device 1 based on the control of the CPU 11. The LCD 18 displays, for example, a mode selection screen (see FIG. 7A), a telephone directory content screen (see FIG. 7B), a copy setting screen (see FIGS. 9A and 9B), and a facsimile transmission setting screen (see FIG. 12A and 12B).

The amplifier 27 is connected to a speaker 28. The speaker 28 generates a call tone.

The facsimile device 1 is connected to the switchboard 29 through the NCU 19 and a telephone line 41. The switchboard 29 is connected to the switchboard (not shown) of the transmitting source device through a telephone line 42 and further connected to the transmitting source device (not shown) through a telephone line (not shown). Therefore, the facsimile device 1 can receive the facsimile data 63 transmitted from the transmitting source device through the telephone line 41, switching board 29, and telephone line 42.

Figure 3A:
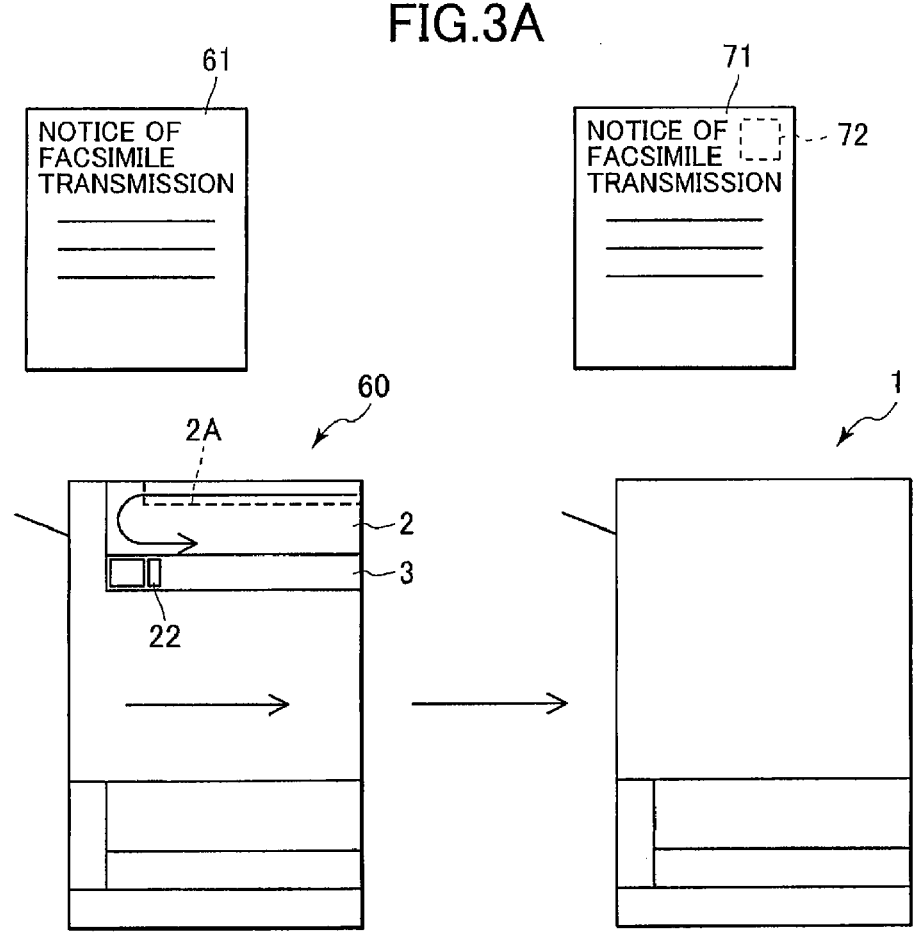
FIG. 3A is a schematic diagram showing a facsimile reception performed by the facsimile device according to the embodiment.
Figure 3B:
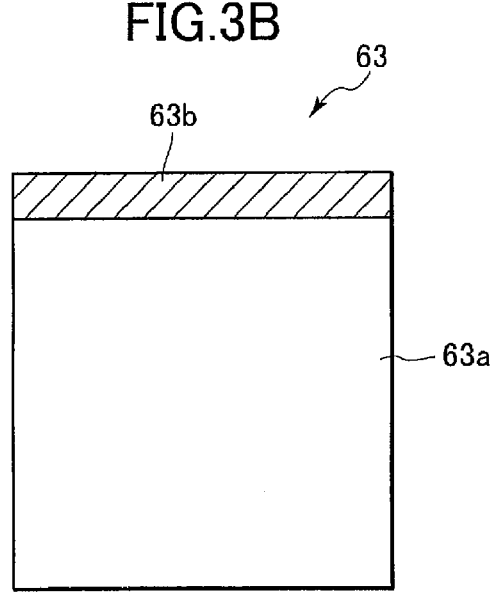
FIG. 3B is a diagram schematically showing facsimile data for one page.

Next, transmitting and receiving the facsimile data 63 in the facsimile device 1 according to this embodiment will be described with reference to FIG. 3A and 3B. FIG. 3A is a diagram showing a facsimile transmission between the facsimile device 1 and the transmitting source device 60.

The transmitting source device 60 shown in FIG. 3A has the same configuration as the facsimile device 1 described above.

As shown in FIG. 3A, an image (including figures and characters) is formed on a document (hereinafter called a transmitting document 61), which a user of the transmitting source device 60 (hereinafter referred to as transmitting source user) transmits by facsimile.

The transmitting source user sets the transmitting document 61 on the document mount unit 2A, and operates the start key (not shown) provided on the operation panel 17. Then, the transmitting document 61 is fed, page by page, to the reading position (the scanner 22) of the scanner unit 3. The scanner unit 3 creates image data in units of pages. Thus, the facsimile data 63 is created on the transmitting source device 60 by scanning the transmitting document 61 by the scanner 22 and is transmitted to the facsimile device 1.

Next, the structure of the facsimile data 63 for one page of the transmitting document 61 will be described with reference to FIG. 3B. FIG. 3B is a diagram explaining the structure of the facsimile data 63 for one page of the original document 61.

As mentioned above, the facsimile data 63 includes the image data 63a and the additional data 63b. The image data 63a is based on one page of the original document 61. The additional data 63b is based on various data sets for the transmission and reception of the facsimile data 63. The additional data 63b contains transmitting source data (e.g., facsimile number) that identifies the transmitting source device 60, i.e., the source from which the facsimile data 63 has been transmitted. Thus, the facsimile data 63 is composed of the image data 63a read by the scanner 22 and the additional data 63b added to the image data, in units of pages, by the transmitting source device 60.

When this facsimile data 63 is transmitted from the transmitting source device 60 to the facsimile device 1, the facsimile device 1 can form an image on the recording paper 71 (see FIG. 3A), based on the image data 63a included in the facsimile data 63.

The additional data 63b included in the facsimile data 63 is written in the wireless tag 72 attached to the recording paper 71, if the facsimile device 1 is set in a prescribed setting. The process performed in the facsimile device 1 will be later described in detail.

The configuration of the wireless tag 72, wireless tag reader 15 and wireless tag writer 16 according to this embodiment will be described in detail with reference to the drawings.

Figure 4A:
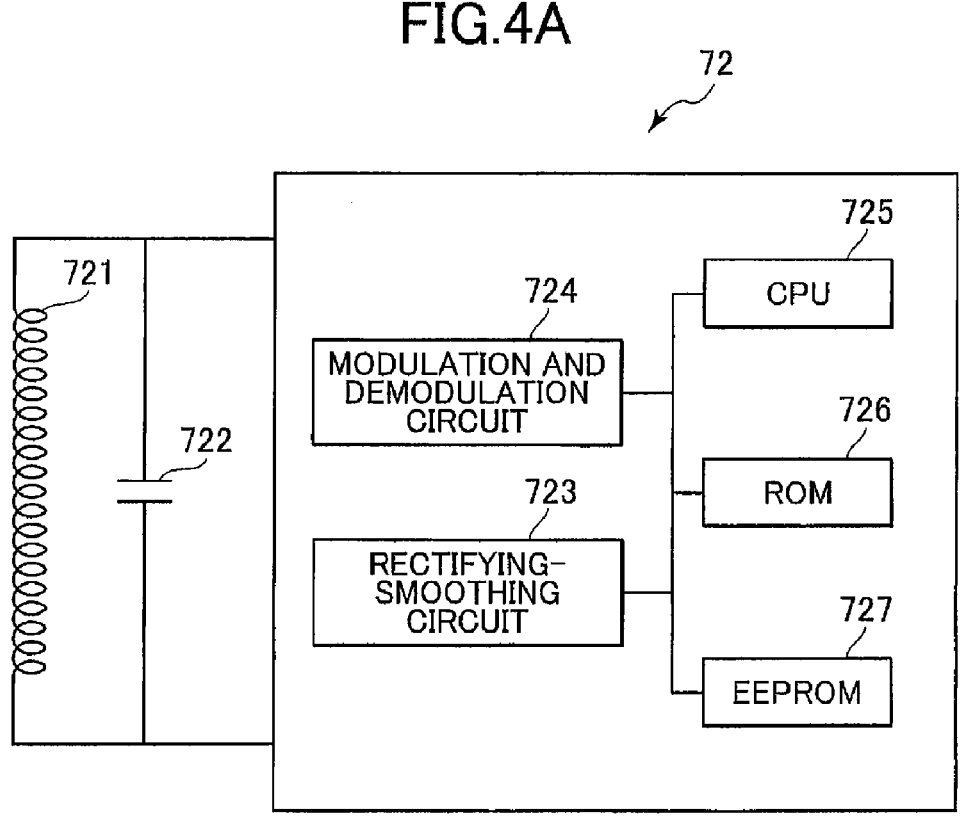
FIG. 4A is a block diagram showing a configuration of a wireless tag.

First, the configuration of the wireless tag 72 will be described. As shown in FIG. 4A, the wireless tag 72 includes an antenna coil 721, a resonant capacitor 722, a rectifying-smoothing circuit 723, a modulation and demodulation circuit 724, a CPU 725, a ROM 726, and an EEPROM 727.

The antenna coil 721 is connected in parallel to the resonant capacitor 722. Thus, the antenna coil 721 and the resonant capacitor 722 constitute a resonant circuit. The resonant circuit receives a power source wave having a predetermined high frequency, which has been transmitted from the wireless tag reader 15 or wireless tag writer 16. The resonant circuit supplies a power source wave signal to the rectifying-smoothing circuit 723.

The rectifying-smoothing circuit 723 is a power-supply circuit. The rectifying-smoothing circuit 723 receives a power source wave signal transmitted from the resonant circuit and rectifies and smoothes the power source wave signal, generating DC power at a constant voltage. The DC power is supplied to the CPU 725.

A transmission signal transmitted from the wireless tag reader 15 or wireless tag writer 16 is superposed on the power source wave signal. The transmission signal is supplied to the modulation and demodulation circuit 724. The modulation and demodulation circuit 724 demodulates the transmission signal. The demodulated signal is supplied to the CPU 725.

The CPU 725 is activated in accordance with the operating program stored in the ROM 726 and performs a prescribed process in response to the demodulated signal supplied from the modulation and demodulation circuit 724. More precisely, the CPU 725 executes a writing process for writing received data as wireless tag data in the EEPROM 727 and a reading process for reading the wireless tag data from the EEPROM 727, demodulating the wireless tag data by the modulation and demodulation circuit 724, and transmitting the demodulated wireless tag data as a wave signal from the antenna coil 721.

In the wireless tag 72, the rectifying-smoothing circuit 723, modulation circuit 724, CPU 725, ROM 726 and EEPROM 727 are formed as an IC chip. The IC chip is embedded in the recording paper 71, together with the antenna coil 721 and resonant capacitor 722.

Figure 4B:
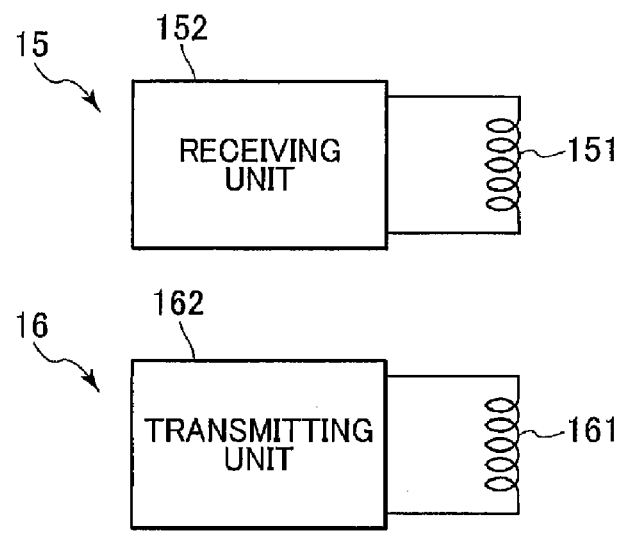
FIG. 4B is a block diagram showing a wireless tag reader and a wireless tag writer.

The configurations of the wireless tag reader 15 and wireless tag writer 16 according to this embodiment will be described in detail, with reference to the drawings. FIG. 4B is a block diagram showing the configurations of the wireless tag reader 15 and the wireless tag writer 16.

As shown in FIG. 4B, the wireless tag reader 15 includes a receiving antenna coil 151 and a receiving unit 152. The wireless tag reader 15 can therefore receive a wave signal transmitted from the wireless tag 72 at the receiving antenna coil 151. The wave signal received at the receiving antenna coil 151 is supplied to the receiving unit 152. The receiving unit 152 demodulates the wave signal, recognizing the wave signal as wireless tag data. The wireless tag reader 15 can therefore read the wireless tag data (i.e., additional data) from the wireless tag 72.

The wireless tag writer 16 includes a transmitting antenna coil 161 and a transmitting unit 162. In the wireless tag writer 16, the transmitting unit 162 modulates a carrier signal, generating a power source wave signal, and the transmitting antenna coil 161 transmits the generated power source wave signal. Further, the wireless tag writer 16 can modulate the wireless tag data to be transmit, by the transmitting unit 162, thus superposing the wireless tag data on the power source wave signal, and can transmit the wireless tag data superposed with the power source wave signal from the transmitting antenna coil 161. Thus, the wireless tag writer 16 can write the wireless tag data (i.e., additional data) in the wireless tag 72.

Figure 5:
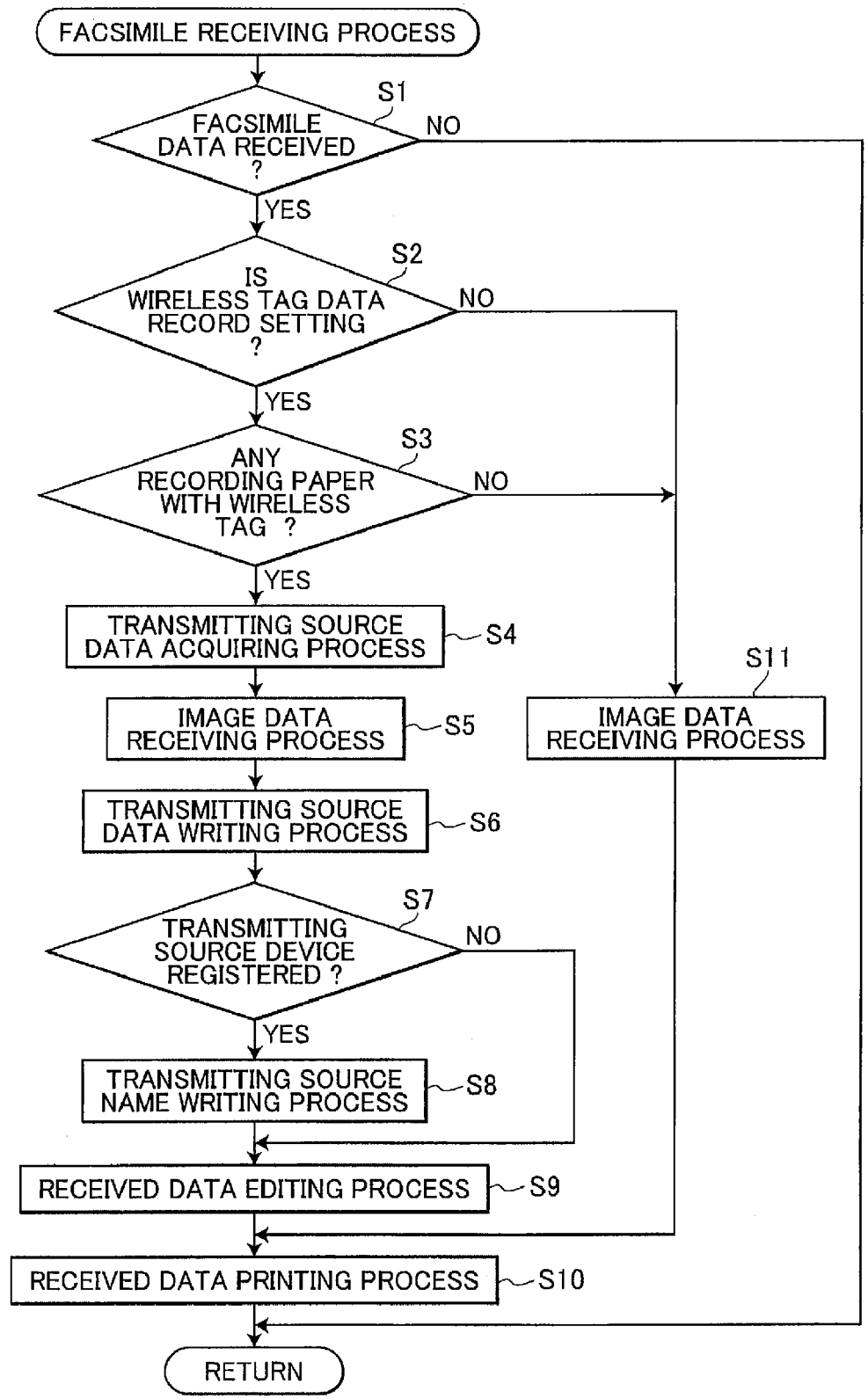
FIG. 5 is a flowchart illustrating steps in a facsimile receiving process program according to the embodiment.

The facsimile receiving process program used in the facsimile device 1 according to this embodiment will be described in detail with reference to the drawings. FIG. 5 is a flowchart illustrating steps in the facsimile receiving process program. The process performed based on the facsimile receiving process program is repeated while the facsimile device 1 is being activated.

When the facsimile receiving process program is started, in S1 the CPU 11 first determines whether the facsimile device 1 has received facsimile data 63 from any other facsimile device (i.e., transmitting source device 60). If the facsimile device 1 has received the facsimile data 63 (S1: YES), the CPU 11 advances to S2. If the facsimile device 1 has not received the facsimile data 63 (S1: NO), the CPU 11 stops executing the facsimile receiving process program. In this case, the CPU 11 again starts executing the facsimile receiving process program.

In S2 the CPU 11 refers to the setting data memory 141 of the facsimile device 1 and determines whether or not the wireless tag record setting data has been set to "record setting". If the wireless tag record setting data has been set to "record setting" (S2: YES), the CPU 11 advances to S3. If the wireless tag record setting data has not been set to "record setting" (S2: NO), the CPU 11 advances to an image data receiving process in S11.

In S3 the CPU 11 determines, from a detection result of the detection sensors 54, whether or not the uppermost recording paper 71 in any one of the first, second and third sheet-feeding trays 51, 52 and 53 has the wireless tag 72. If the uppermost recording paper sheet 71 has the wireless tag 72 (S3: YES), the CPU 11 advances to the transmitting source data acquiring process in S4. If the uppermost recording paper sheet 71 does not have a wireless tag 72 (S3: NO), the CPU 11 advances to the image data receiving process in S11.

In the transmitting source data acquiring process of S4, the CPU 11 acquires the transmitting source data (i.e., facsimile number) that is the additional data, based on the facsimile data 63 (a facsimile signal). Upon acquiring the transmitting source data from the facsimile signal, the CPU 11 stores the transmitting source data in the RAM 13. Then, the CPU 11 advances to an image data receiving process of S5.

In this process, the transmitting source data is acquired based on a TSI signal for the facsimile transmission. If the transmitting source device 60 transmits data to a destination device using an NSS signal, the facsimile device 1 may be acquire the transmitting source data of the transmitting source device 60 based on the NSS signal.

In the image data receiving process of S5, the CPU 11 receives the image data that is included in the facsimile data 63. The CPU 11 stores the received image data in the facsimile receiving data storage area 132. Then, the CPU 11 advances to a transmitting source data writing process in S6. The received image data in the image data receiving process of S5 may include, as a part of the image data, data identifying the transmitting source in which corresponds to the content of the additional data. This case will be explained later in detail.

In the transmitting source data writing process of S6, the CPU 11 reads the transmitting source data acquired in S4 from the RAM 13. The CPU 11 then causes the wireless tag writer 16 to write the transmitting source data into the wireless tag 72 attached to the recording paper 71.

The CPU 11 writes receiving date and time data indicating the date and time of receiving the facsimile data 63, into the wireless tag 72 together with the transmitting source data. Since the receiving date and time data can be acquired by the technique known in the art, how to acquire this data will not be explained here. After writing the transmitting source data into the wireless tag 72, the CPU 11 advances to S7.

In S7 the CPU 11 refers to the telephone directory data storage area 142 and determines whether the transmitting source device 60, which transmits the facsimile data 63, has already been registered in the telephone directory data storage area 142. In this embodiment, any transmitting source data of the transmitting source device that coincides with a transmitting source device registered in the telephone directory data storage area 142 will be referred to as "registered transmitting source data" hereinafter. That is, the CPU 11 determines whether the transmitting source data acquired in the transmitting source data acquiring process of S7 is "registered transmitting source data."

If the acquired transmitting source data is "registered transmitting source data" (S7: YES), the CPU 11 advances to a transmitting source name writing process of S8. On the other hand, if the acquired transmitting source data is not "registered transmitting source data" (S7: NO), the CPU 11 advances to a received data editing process of S9.

In the transmitting source name writing process of S8, the CPU 11 refers to the telephone directory data storage area 142 and acquires the transmitting source name that is associated with the transmitting source device, which coincides with the transmitting source data acquired in S4. The CPU 11 then causes the wireless tag writer 16 to write the acquired transmitting source name, into the wireless tag 72 in which the transmitting source data is recorded. After the transmitting source name has been written into the wireless tag 72, the CPU 11 advances to the received data editing process of S9.

The wireless tag data thus written into the wireless tag 72 includes the receiving date and time data and the transmitting source name, in addition to the additional data (transmitting source data) received from the transmitting source. The data representing the transmitting source number (e.g., facsimile number) and the data representing the receiving date and time are composed of code data sets representing characters. That is, the image based on the additional data written in the wireless tag 72 is created based on the code data sets representing characters.

In the received data editing process of S9, the CPU 11 performs the image editing process on the facsimile data 63 stored in the facsimile reception data storage area 132. More specifically, the CPU 11 performs image edition on the facsimile data 63 to provide a non-printed region (blank) on a recording paper, in order not to print the transmitting source data. This is because the image data pertaining to the facsimile data 63 may contain data that corresponds to the additional data according to this embodiment and that identifies the transmitting source. After performing the received data editing process of S9, the CPU 11 advances to a received data printing process of S10.

The received data editing process of S9 according to this embodiment will be explained. As stated above, the image data may contain data (hereinafter called "intra-image transmitting source data") that corresponds to the additional data according to this embodiment and that identifies the transmitting source. The intra-image transmitting source data will be printed together with the image of the image data, when the image data is printed in the received data printing process of S10, unless any processes are taken against the intra-image transmitting source data. In order not to print the transmitting source data, the intra-image transmitting source data must be designated and be inhibited from being printed.

In view of this, the intra-image transmitting source data is edited in the received data editing process of S9. More precisely, any black-dot data sets in a part (e.g., first several lines of image data) of the received image data, which will be printed in the upper margin of a recording paper, are converted into white-dot data sets, because the intra-image transmitting source data is printed usually in the upper margin of the recording paper. The part of the received image data includes the intra-image transmitting source data. As a result, the black-dot data sets, which are the intra-image transmitting source data, are converted into the white-dot data sets. Thus, the image data is edited so that the part of the received image data, which identifies the transmitting source, does not form an image on the recording paper.

The way of editing the received image data in the received data editing process of S9 is not limited to the one explained above. The received image data can be edited in various manners. For example, all of the part of the received image data, which will be printed in the upper margin of a recording paper, may be converted into white-dot data sets. All of the part of the received image data may therefore not form an image on the recording paper.

Alternatively, all of the part of the received image data, which will be printed in the upper margin of a recording paper, may be eliminated. Data representing a white image equivalent in size to the eliminated part may therefore be combined with the remaining image data. Thus, all of the part of the received image data may therefore not form an image on the recording paper.

In the received data printing process of S10, the CPU 11 first creates image data from the facsimile data 63 (the received image data) edited in the received data editing process of S9. Then, the CPU 11 causes the laser printer 30 to print an image based on the image data on the recording paper 71. When the laser printer 30 finishes printing the image data, the CPU 11 stops executing the facsimile reception process program.

As indicated above, the facsimile data 63 is edited in the received-data editing process of S9 so that the part of the image data, which identifies the intra-image transmitting source data, does not form an image on the recording paper. Hence, the intra-image transmitting source data does not form an image on the recording paper 71 when the facsimile data 63 edited in the received data editing of S9 is printed on the recording paper sheet 71. Thus, only the image based on the image printed on the page of the document 61 is printed on the recording paper 71.

Of the image data output in this case, the intra-image transmitting source data is not printed. Instead, the transmitting source data received as additional data, and the name of the transmitting source and the receiving date and time data are written in the wireless tag 72.

As indicated above, the CPU 11 advances to the image data reception process of S11 if wireless tag data has not been set to "recorded setting" (S2: NO) or if the uppermost recording paper sheet 71 does not have a wireless tag 72 (S3: NO). In the image data reception process of S1, the CPU 11 receives the facsimile data 63. After receiving the facsimile data 63, the CPU 11 stores the facsimile data 63 in the facsimile receiving data storage area 132. Then, the CPU 11 advances to the received data printing process of S10.

When the CPU 11 advances from the image data reception process of S11 to the received data printing process of S10, the CPU 11 creates image data from the facsimile data 63 stored in the facsimile-reception data storage area 132. Next, the CPU 11 causes the laser printer 30 to print an image based on the image data on the recording paper 71. When the laser printer 30 finishes printing the image data, the CPU 11 stops executing the facsimile receiving process program.

In this case, the facsimile data 63 has not been subjected to the transmitting source data writing process of S6, the transmitting source name writing process of S8 or the received data editing process of S9. Therefore, characters such as the receiving date and time data and the transmitting source number, both included in the intra-image transmitting source data, are printed on the recording paper 71. The additional data and transmitting source name are never written into the wireless tag 72. That is, the facsimile device 1 receives and prints the facsimile data 63 as a normal operation of the facsimile device 1.

Figure 6:
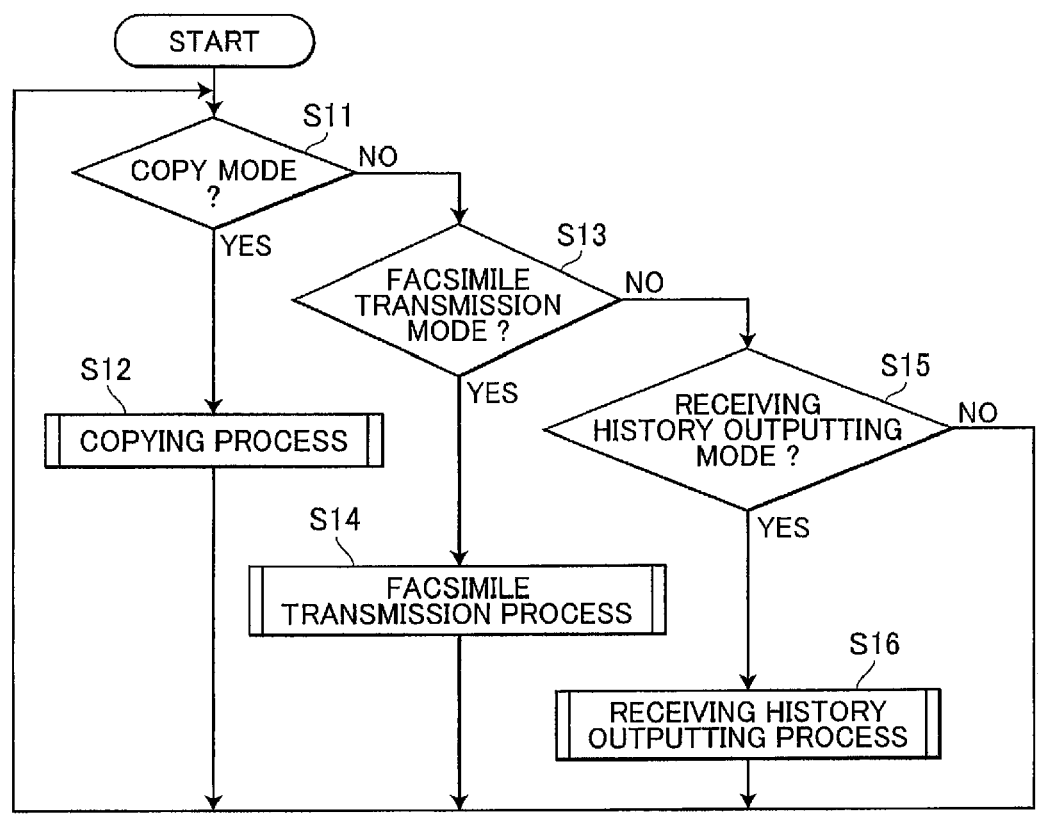
FIG. 6 is a flowchart illustrating steps in a routine process program according to the embodiment.

The routine process program of the facsimile device 1 according to this embodiment will be described in detail with reference to FIG. 6. FIG. 6 is a flowchart illustrating steps in the routine process program.

The routine process program is executed while the facsimile device 1 is not executing the facsimile receiving process program.

Figure 7A:
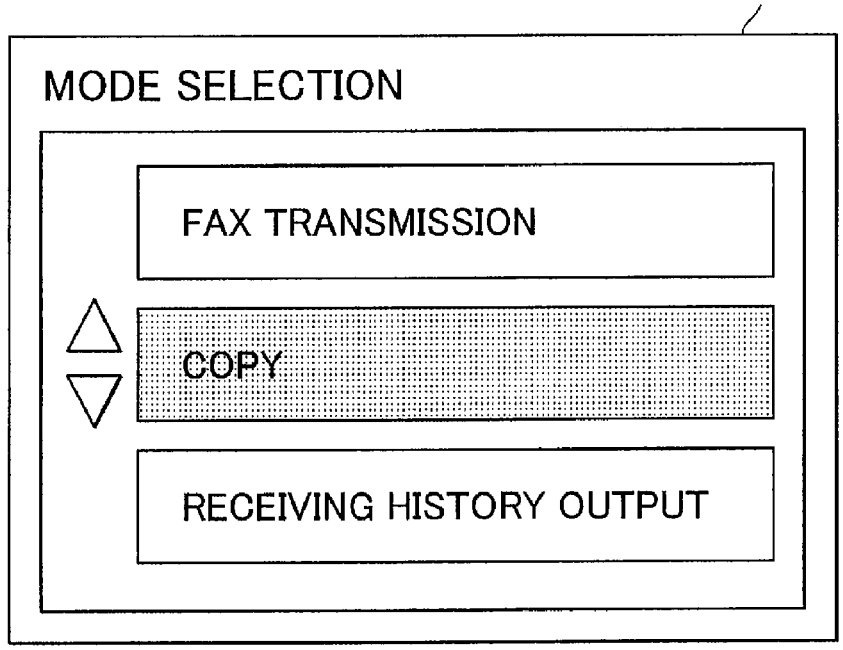
FIG. 7A shows a mode selection screen displayed on a LCD according to the embodiment.
Figure 7B:
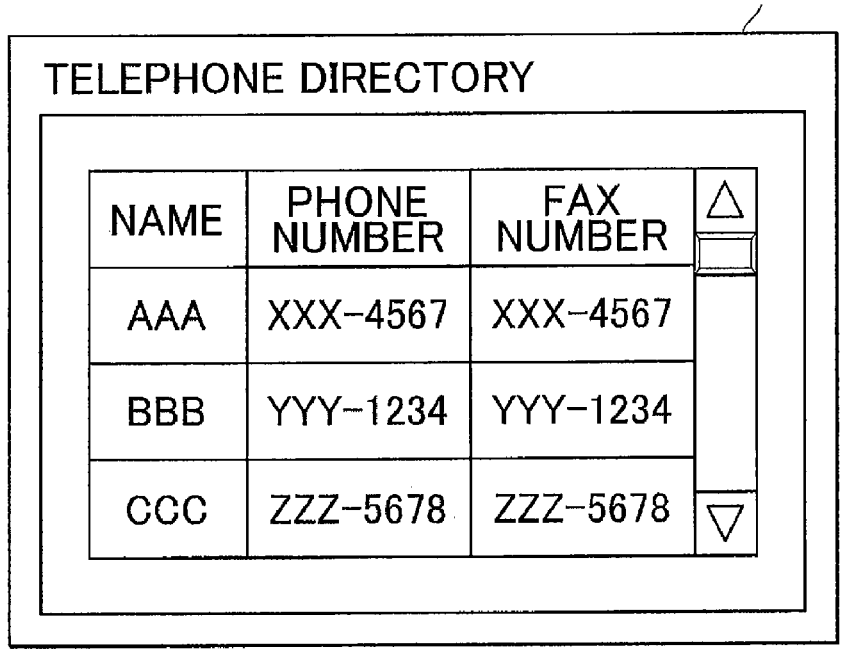
FIG. 7B shows a telephone directory content screen displayed on the LCD according to the embodiment.

In the routine process program, the CPU 11 first causes the LCD 18 to display the mode selection screen (see FIG. 7A).

As shown in FIG. 7A, selection items "FAX Transmission," "Copy," and "Receiving History Output" are displayed on the mode selection screen of the LCD 18. The user may operate the operation panel 17 to select one of these selection items, i.e., "FAX Transmission," "Copy," and "Receiving History output."

The user may select "FAX Transmission" to set the facsimile device 1 to the facsimile transmission mode, or "Copy" to set the facsimile device 1 to the copy mode or "Reception History Output" to set the facsimile device 1 to the receiving history outputting mode.

In S11 the CPU 11 determines whether the facsimile device 1 has been set to the copy mode. To be more specific, the CPU 11 determines whether the facsimile device 1 has been set to the copy mode based on an operation signal from the operation panel 17. If the facsimile device 1 has been set to the copy mode (S11: YES), the CPU 11 advances to a copying process of S12. If the facsimile device 1 has not been set to the copy mode (S11: NO), the CPU 11 advances to S13.

In the copying process of S12, the CPU 11 executes a copying process program, which will be described later. In the copy process of S12, the facsimile data 63 received by using the facsimile receiving process program described above is printed on a recording paper. Upon finishing the copy process of S12, the CPU 11 returns to S11.

The copy process program executed in S12 will be described later in detail with reference to the drawings.

In S13 the CPU 11 determines whether the facsimile device 1 has been set to the facsimile transmission mode. More precisely, the CPU 11 determines whether "FAX Transmission" has been selected based on an operation signal supplied the operation panel 17. If the facsimile device 1 has been set to the facsimile transmission mode (S13: YES), the CPU 11 advances to the facsimile transmission process of S14. If the facsimile device 1 has not been set to the facsimile transmission mode (S13: NO), the CPU 11 advances to S15.

In the facsimile transmission process of S14, the CPU 11 executes the facsimile transmission process program, which will be described later. That is, in facsimile transmission process of S14, the facsimile data 63 based on the document 61 is transmitted to the destination device. After the facsimile data 63 has been transmitted, the CPU 11 returns to S11.

The facsimile transmission process program executed in the facsimile transmission process of S14 will be described later in detail with reference to the drawings.

In S15 the CPU 11 determines whether the facsimile device 1 has been set to the receiving history outputting mode. More precisely, the CPU 11 determines whether "Reception History Output" has been selected based on an operation signal from the operation panel 17. If the facsimile device 1 has been set to the receiving history outputting mode (S15: YES), the CPU 11 advances to the receiving history outputting process of S16. If the facsimile device 1 has not been set to the receiving history outputting mode (S15: NO), the CPU 11 returns to S11.

In the reception history outputting process of S16, the CPU 11 executes the receiving history outputting process program, which will be described later. In the receiving history outputting process of S16, the CPU 11 creates a receiving history based on the recording paper on which the received facsimile data 63 is printed. The created reception history is output. After performing the receiving history outputting process of S16, the CPU 11 returns to S11.

The receiving history outputting process program, which is executed in the receiving history outputting process of S16, will be described later in detail with reference to the drawings.

Figure 8:
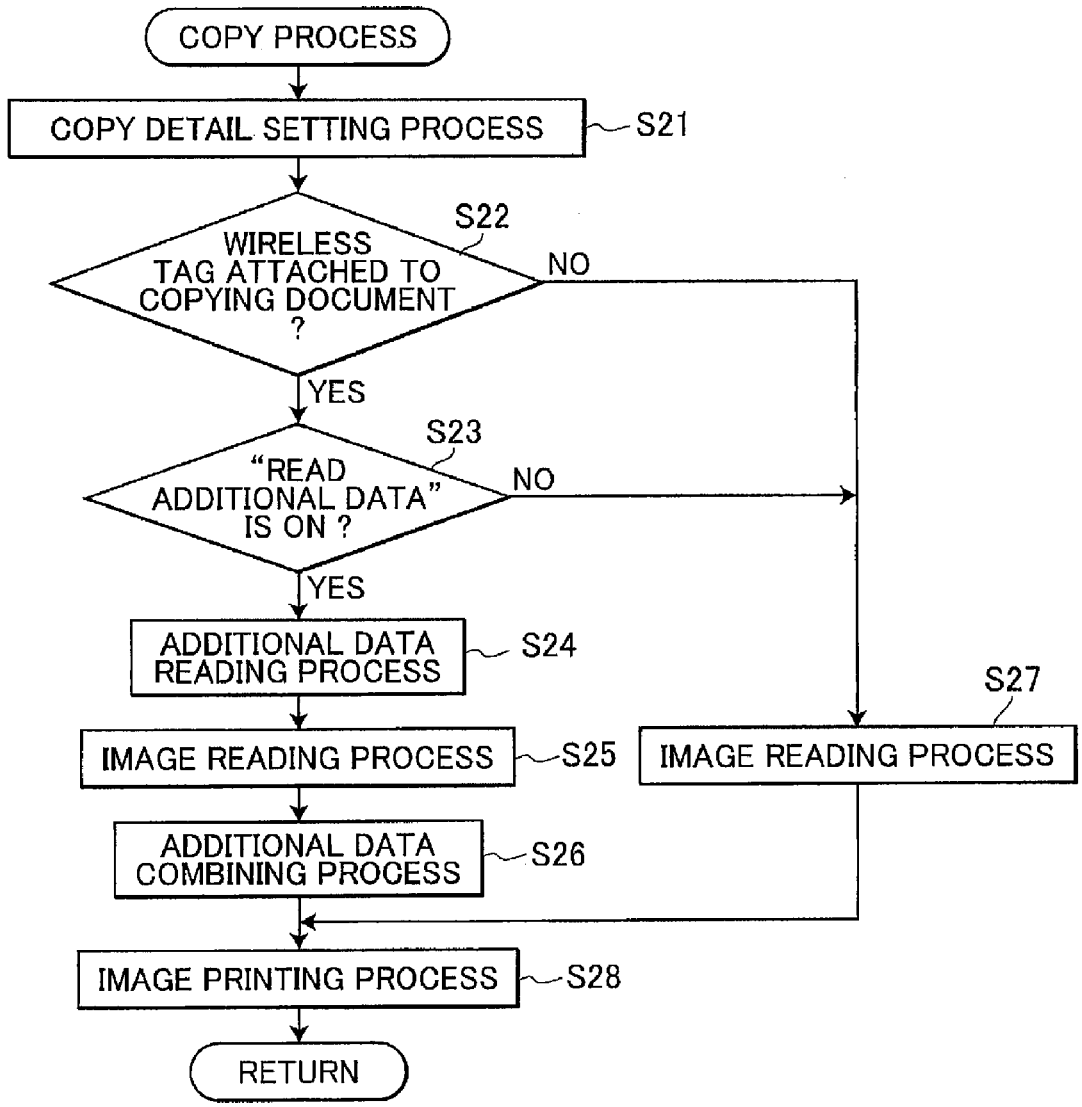
FIG. 8 is a flowchart illustrating steps in a copy process program according to the embodiment.

Next, the copy process program executed in the copy process of S12 will now be explained in detail with reference to FIG. 8. FIG. 8 is a flowchart illustrating steps in the copy process program.

In the copy process of S12, firstly, the CPU 11 performs a copy detail setting process of S21.

In the copy detail setting process of S21, the CPU 11 first causes the LCD 18 to display the copy setting screen. Then, the CPU 11 determines various conditions in which to copy a copying document, based on the operation on the operation panel 17 by the user.

The copying document is the document mounted on the document mount unit 2A at the time of setting the copy mode. Hence, in this embodiment, the recording paper 71 on which, in the facsimile receiving process program, the image based on the facsimile data (image data) 63 has been printed, can be used as the copying document (see FIG. 10A) Thus, the recording paper 71 on which the image has been printed and which has the wireless tag 72 storing the additional data can also be used as the copying document (see FIG. 10B).

The copy setting screen and detail setting items in the copy detail setting process of S21 will be described. As shown in FIG. 9A, a setting item "Read Additional Data" is displayed on the copy setting screen. If the setting item "Read Additional Data" is selected, the data such as the additional data will be read from the wireless tag 72, if any, attached to the copying document. That is, the setting item "Read Additional Data" indicates whether the additional data should be read from the wireless tag 72 if the wireless tag 72 is attached to the copying document. Therefore, if the operation panel 17 is operated, setting "ON" the item "Read Additional Data," the additional data will be read from the wireless tag 72 attached to the copying document. If the setting item "Read Additional Data" is "OFF," the additional data will not be read from the wireless tag 72 regardless of the copying document having the wireless tag 72.

If the setting item "Read Additional Data" is "ON," some detail setting items for a process of the additional data read from the wireless tag 72 can be set. As shown in FIG. 9B shows, detail setting items "Designate Print Position" and "Print Size" are displayed on the copy setting screen, if the setting item "Read Additional Data" is "ON".

The detail setting item "Designate Print Position" is for designating a position where to print the additional data read from the wireless tag 72 on a recording paper 71. When the detail setting item "Designate Print Position" is selected, the position is designated, where an image based on the additional data should be printed on the one-page recording paper 71 together with the image based on the copying document.

More specifically, one of the four print positions, i.e., "Upper Left," "Upper Right," "Lower Left" and "Lower Right," can be set once the detail setting item "Designate Print Position" has been selected. If "Upper Left" is set while the item "Designate Print Position" remains selected, the image based on the additional data read from the wireless tag 72 will be printed on the upper left part of the recording paper 71. The print positions that can be set are not limited to these four. The facsimile device 1 may be designed that the user can designate any desired print position by using a touch panel.

The detailed setting item "Print Size" is for designating a size of characters in which to print the additional data read from the wireless tag 72 attached to the copying document that should be copied. More specifically, several options are available for the "Print Size," i.e., "6 pt," "8 pt" "10 pt," "11 pt," and so on. If "10 pt" is set while the item "Print Size" remains selected, the image based on the additional data read from the wireless tag 72 will be printed on the recording paper 71, in character size adjusted to 10 pt.

In the copy detail setting process of S21, the user operates the operation panel 17, selecting the setting item and then setting a detail setting item. Then, the CPU 11 stores the selected items (e.g., "Print Position; Upper Left," or "Print Size; 10 pt") in the setting data memory 141. After storing the selected items in the setting data memory 141, the CPU 11 terminates the copy detail setting process of S21 and advances to S22.

In S22 the CPU 11 determines whether a wireless tag 72 is attached to the copying document. If a wireless tag 72 is attached to the copying document (S22: YES), the CPU 11 advances to S23. Assume that the CPU 11 has executed the facsimile receiving process program, whereby the image data 63a included in the received facsimile data 63 is printed, and that a recording paper 71 having a wireless tag 72 storing the additional data 63b for the facsimile data 63 is used as the copying document. In this case, the CPU 11 advances to S23. If no wireless tag 72 is attached to the copying document (S22: NO), the CPU 11 advances to a document image reading process of S27.

In S23 the CPU 11 refers to the setting data memory 141 and determines whether the data read setting for the additional data is valid in the copy mode. If the setting item "Read Additional Data" is "ON" (S23: YES), the CPU 11 advances to an additional data reading process of S24. If the setting item "Read Additional Data" is "OFF" (S23: NO), the CPU 11 advances to the document image reading process of S27.

In the additional data reading process of S24, the CPU 11 causes the wireless tag reader 15 to read the additional data written in the wireless tag 72 on the copying document. After storing the additional data in the RAM 13, the CPU 11 advances to a document image reading process of S25.

In the document image reading process of S25, the CPU 11 causes the scanner 22 to read an image printed on the copying document. The CPU 11 then stores image data of the image in the facsimile transmission data storage area 131. After storing the image data in the facsimile transmission data storage area 131, the CPU 11 advances to an additional data combining process of S26.

In the additional data combining process of S26, the CPU 11 first reads the additional data stored in the RAM 13 and creates image data (hereinafter referred to as additional image data) based on the additional data. More precisely, when the additional image data is created, the CPU 11 refers to the setting data memory 141, thereby creating the additional image data of a size based on the selected item of the detail setting item "Print Size" Then, the CPU 11 reads the image data based on the copying document from the facsimile transmission data storage area 131, and combines this image data with the additional image data, creating combined image data. When the CPU 11 creates the combined image data, the CPU 11 first refers to the setting data memory 141 and combines the additional image data with the image data such that the additional image data is positioned on the image data at a position that corresponds to the detailed setting item "Print Position." After storing the combined image data in the facsimile transmission data storage area 131, the CPU 11 advances to an image printing process of S28.

If no wireless tags 72 are attached to the copying document (S22: NO) and if the setting item "Read Additional Data" is "OFF" (S23: NO), the CPU 11 performs the document image reading process of S27. In the document image reading process of S27, the CPU 11 causes the scanner 22 to read the image printed on the copying document and stores the image data in the facsimile transmission data storage area 131 similarly to S25. After storing the image data in the facsimile transmission data storage area 131, the CPU 11 advances to the image printing process of S28.

In the image printing process of S28, the CPU 11 first reads the image data or combined image data stored in the facsimile transmission data storage area 131. Then, the CPU 11 causes the laser printer 30 to print the image data or combined image data on the recording paper 71. After the image data or combined image data has been printed, the CPU 11 stops the copy process program.

In the image printing process of S28, if an image based on the combined image data is printed on the recoding paper 71, an image based on the additional data is printed on the recording paper 71 together with the image printed on the copying document. If the image based on the image data is printed in the image printing process of S28, only the image printed on the copying document is printed on the recording paper 71.

Figure 10A:
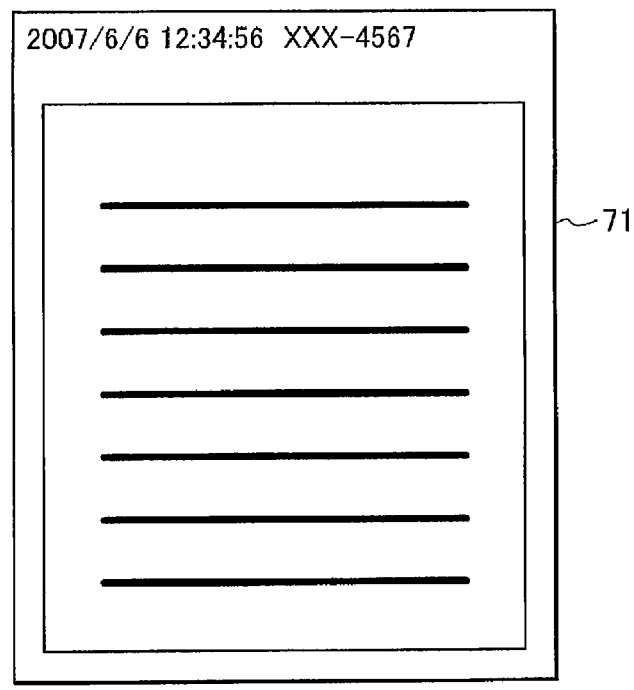
FIGS. 10A and 10B are explanatory diagrams showing recoding papers on which data has been printed by executing the facsimile receiving process program.
Figure 10B:
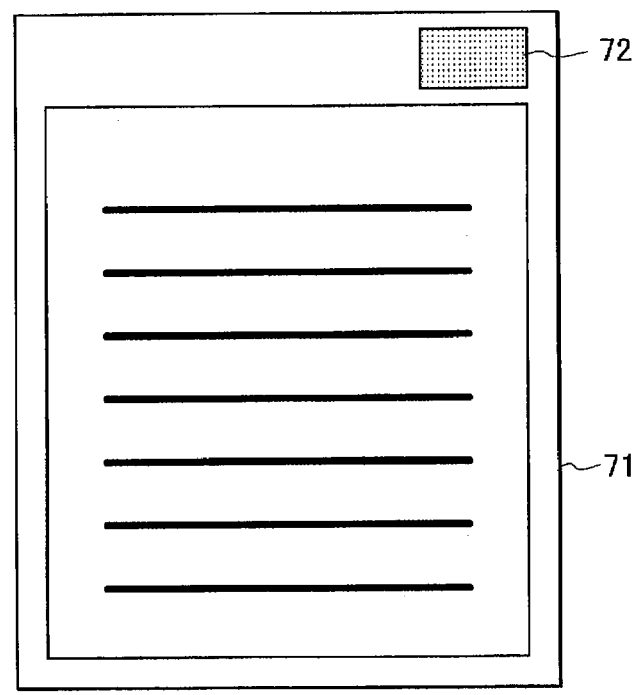

Thus, if a recording paper 71 (FIG. 10B) having a wireless tag 72 storing the additional data is used as the copying document, the additional data not printed on the copying document can be read from the wireless tag 72 and printed on another recording paper 71 (see FIG. 10A). This can be accomplished by setting the setting item "Read Additional Data" to "ON." That is, the facsimile device 1 can print the image based on the additional data together with the image based on the copying document even if the contents of the additional data (i.e., the receiving date and time and the transmitting-source number) are later found to be necessary.

The facsimile transmission process program executed in the facsimile transmission process of S14 will now be described later in detail with reference to FIG. 11. FIG. 11 is a flowchart illustrating steps in the facsimile transmission process program.

In the facsimile transmission process of S14, when the facsimile transmission process program is started, the CPU 11 firstly executes the transmission detail setting process of S31.

In the transmission detail setting process of S31, the CPU 11 first causes the LCD to display a facsimile transmission setting screen (see FIG. 12A). The CPU 11 then determines various conditions for a facsimile transmitting of a transmitting document based on the operation on the operation panel 17 by the user.

The transmitting document is the document mounted on the document mount unit 2A at the time of setting the facsimile transmission mode. Hence, in this embodiment, the recording paper 71 on which, in the facsimile receiving process program, the image based on the facsimile data (image data) 63 has been printed, can be used as the transmitting document (see FIG. 10A). Thus, the recording paper 71 on which the image has been printed and which has the wireless tag 72 storing the additional data can also be used as the transmitting document (see FIG. 10B).

The facsimile transmission setting screen and detail setting items in the transmission detail setting process of S31 will be described. As shown in FIG. 12A, a setting item "Read Additional Data" is displayed on the facsimile transmission setting screen. If the setting item "Read Additional Data" is selected, the data such as the additional data will be read from the wireless tag 72, if any, attached to the transmitting document. That is, the setting item "Read Additional Data" indicates whether the additional data should be read from the wireless tag 72 if the wireless tag 72 is attached to the transmitting document.

If the setting item "Read Additional Data" is "ON," a detailed setting item for a facsimile transmission can set. As shown in FIG. 12B, the detail setting item "Add Own Device Data" is displayed on the facsimile transmission setting screen if the setting item "Read Additional Data" is "ON".

The detailed setting item "Add Own Device Data" is an item for designating whether device data for the facsimile device 1 is added to the facsimile data based on the transmitting document. The device data for the facsimile device 1 is additional data including the transmitting source data and the transmitting source name data. The transmitting source data identifies the facsimile device 1 (i.e., source of facsimile transmission). The transmitting source name data represents the name of the source of facsimile transmission.

The device data for the facsimile device and the additional data read from the wireless tag 72 can be transmitted (in the form of, for example, NSS signals), as data sets separately from the image data acquired by reading the transmitting document. Alternatively, the device data and the additional data may be transmitted, contained in the image data, or as part of the image data. The present embodiment will be described on the assumption that the data for the device data and the additional data are transmitted, contained in the image data.

In the transmission detail setting process of S31, the user operates the operation panel 17, selecting the setting item and then setting the detail setting item. Then, the CPU 11 stores the selected items (e.g., "Read Additional Data: ON" and "Add Own Device Data: OFF") in the setting data memory 141. After storing the selected items in the setting data memory 141, the CPU 11 terminates the transmission detail setting process of S31, and advances to S32.

In S32 the CPU 11 determines whether a wireless tag 72 is attached to the transmitting document. If a wireless tag 72 is attached to the transmitting document (YES: S32), the CPU 11 advances to S33. Assume that the CPU 11 has executed the facsimile receiving process program, whereby the image data 63a included in the facsimile data 63 is printed, and that a recording paper 71 having a wireless tag 72 storing the additional data 63b for the facsimile data 63 is used as transmitting document. In this case, the CPU 11 advances to S33. If no wireless tag 72 is attached to the transmitting document (NO: S32), the CPU 11 advances to a document image reading process of S39.

In S33 the CPU 11 refers to the setting data memory 141 and determines whether the data read setting for the additional data is valid in the facsimile transmission mode. If the setting item "Read Additional Data" is "ON" (S33: YES), the CPU 11 advances to an additional data reading process of S34. If the setting item "Read Additional Data" is "OFF" (S33: NO), the CPU 11 advances to the document image reading process of S39.

In the additional data reading process of S34, the CPU 11 causes the wireless tag reader 15 to read the additional data written the wireless tag 72 on the transmitting document. After storing the additional data in the RAM 13, the CPU 11 advances to a document image reading process of S35.

In the document image reading process of S35, the CPU 11 causes the scanner 22 to read an image printed on the transmitting document. The CPU 11 then stores image data for the image in the facsimile transmission data storage area 131. After storing the image data in the facsimile transmission data storage area 131, the CPU 11 advances to an additional data combining process of S36.

In the additional data combining process of S36, the CPU 11 creates image data (i.e., additional image data) based on the additional data acquired in the additional data reading process of S34. Next, the CPU 11 combines the image for the additional image data at a prescribed position in the image on the transmitting document and creates first combined image data. The CPU 11 then stores the first combined image data in the facsimile transmission data storage area 131. After storing the first combined image data, the CPU 11 advances to S37.

In S37 the CPU 11 refers to the setting data memory 141 and determines whether the addition setting of the device data is valid in the facsimile transmission mode. If the setting item "Add Data about Device" is "ON" (S37: YES), the CPU 11 advances to a device data combining process of S38. If the setting item "Add Data about Device" is "OFF" (S37: NO), the CPU 11 advances to a data transmission process of S41.

In the device data combining process of S38, the CPU 11 first creates device data for the facsimile device 1 from the device number data (i.e., the facsimile number of the facsimile device 1) stored in the flash memory 14 and the transmitting source name data. The CPU 11 then combines the first combined image data with image data (hereinafter referred to as device image data) based on the device data for the facsimile device 1, thereby creating second combined image data. After storing the second combined image data in the facsimile transmission data storage area 131, the CPU 11 advances to the data transmission process of S41.

In S39 to which the CPU 11 advances if no wireless tag 72 is attached to the transmitting document (S32: NO) and if the setting item "Read Additional Data" is "OFF" (S33: NO), the CPU 11 performs an document image reading process. The document image reading process of S39 will not be explained in detail, because the process is similar to the document image reading process of S35 described above. After performing the document image reading process of S39, the CPU 11 advances to a device data combining process of S40.

In the device data combining process of S40, the CPU 11 first refers to the flash memory 14, creating device data for the facsimile device 1 from the device number data and the transmitting source name data. Next, the CPU 11 combines the device image data based on the device data, with the image data acquired in the document image reading process of S39, creating third combined image data. After storing the third combined image data in the facsimile transmission data storage area 131, the CPU 11 advances to the data transmission process of S41.

In the data transmission process of S41, the CPU 11 first reads one of the combined image data items stored in the facsimile-transmission data storage area 131 (i.e., first combined image data, second combined image data, or third combined image data). The read combined image data is transmitted as facsimile data 63 to the destination device. The data transmission process of S41 will not be described in detail, because the process is known in the art. Upon finishing the data transmission process of S41, the CPU 11 stops executing the facsimile transmission process program.

After the facsimile data 63 based on the first combined image data has been transmitted in the data transmission process of S41, from the facsimile device 1 to the destination device, an image based on the facsimile data 63 is printed on a recording paper 71 in the destination device. In this case, the additional data including the transmitting source data identifying "the transmitting source device 60 to the facsimile device 1" is printed on the recording paper 71. Hence, the user of the destination device can confirm "an initial transmitting source of data for the facsimile data 63."

When the facsimile data 63 based on the second combined image data is transmitted from the facsimile device 1 to the destination device, the destination device prints two additional data sets on a recording paper 71. One additional data set includes the transmitting source data identifying "the transmitting source device 60 to the facsimile device 1." The other additional data set includes the transmitting source data identifying the "facsimile device 1". Therefore, the user of the destination device can confirm "the initial transmitting source of data for the facsimile data 63" and the "communication route of the data for the facsimile data 63 (i.e., the transmitting source that has relayed the facsimile data 63)."

When the facsimile data 63 based on the third combined image data is transmitted from the facsimile device 1 to the destination device, the destination device prints the additional data including the transmitting source data identifying the "facsimile device 1" on a recording paper 71. Therefore, the user of the destination device can recognize the "transmitting source of the facsimile data 63" at this facsimile transmission.

In this regard, a specific case will be described, wherein the facsimile device 1 named "YYY" receives the facsimile data 63 transmitted from the transmitting source device named "AAA", a recording paper 71 printed with the facsimile data 63 is used as transmitting document, and the facsimile device 1 transmits the facsimile data 63 to another device (destination device).

Figure 13A:
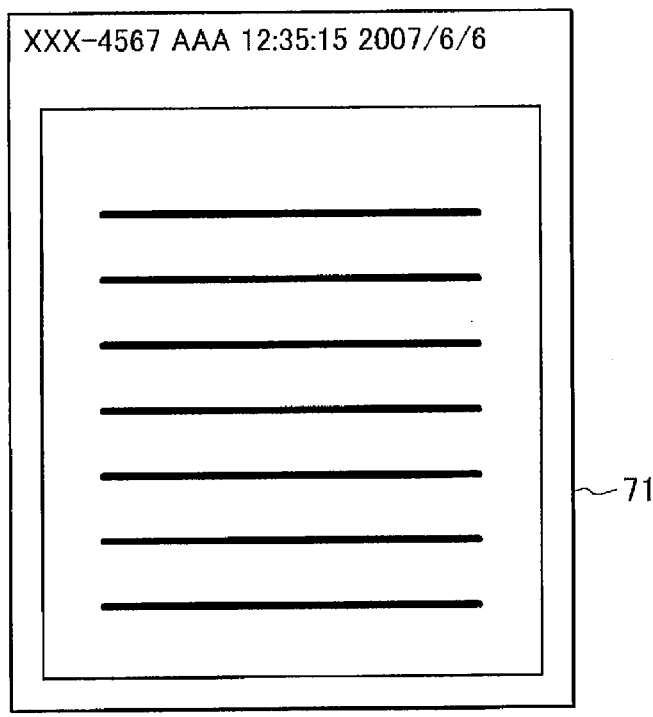
FIGS. 13A and 13B are explanatory diagrams showing recoding papers on which facsimile data has been printed in a destination device by executing the facsimile transmission process program.

In this case, when the facsimile data 63 based on the first combined image data is transmitted to the destination device, the destination device prints an image based on the additional data including the transmitting source name "AAA" (i.e., XXX-4567 AAA 12:35:15 2007/6/6, see FIG. 13A) on a recording paper 71 (see FIG. 13A). Therefore, the user of the destination device can confirm that the initial transmitting source of the data for the facsimile data 63 is the transmitting source device named "AAA".

Figure 13B:
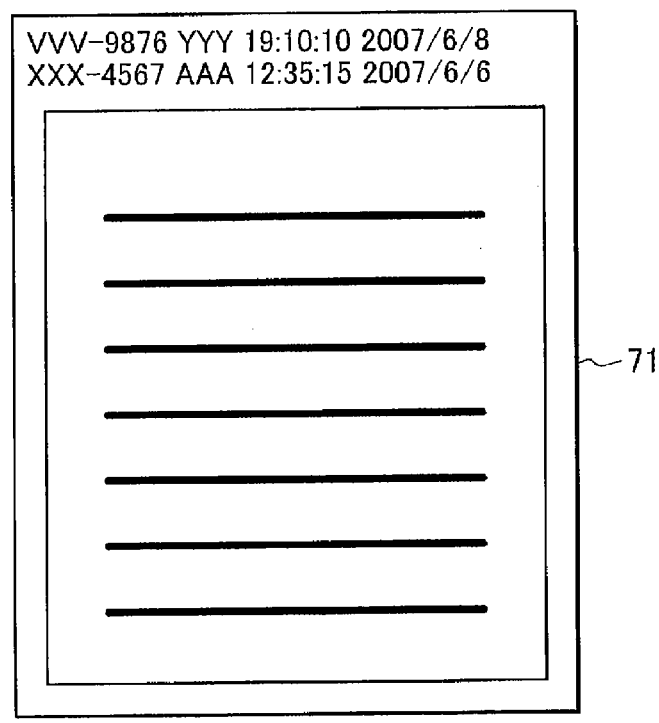
Figure 14:
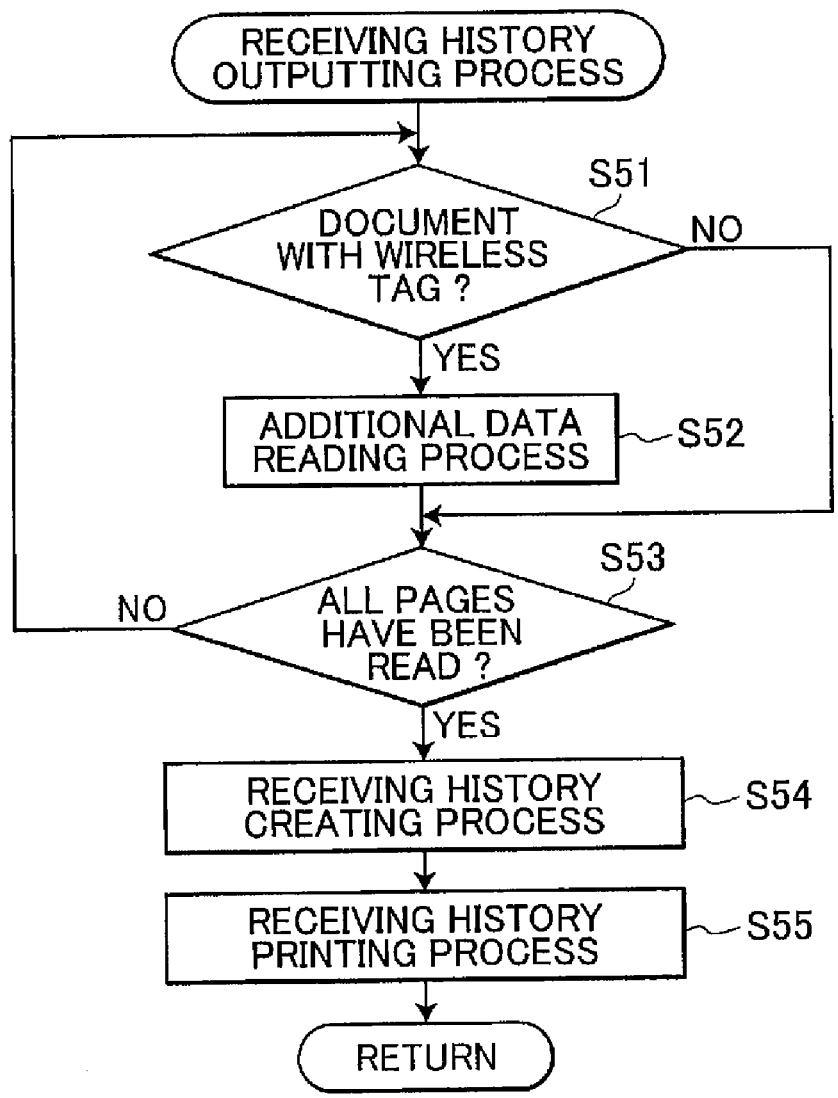
FIG. 14 is a flowchart illustrating steps in the receiving history outputting process program according to the embodiment.

On the other hand, when facsimile data 63 based on the second combined image data is transmitted to the destination device, the destination device prints the image based on the second combined image data on a recording paper 71. More specifically, the additional data including the transmitting source name "AAA" (i.e., XXX-4567 AAA 12:35:15 2007/6/6) shown in FIG. 13B and the device data identifying the facsimile device 1 (i.e., VVV-9876 YYY 19:10:10 2007/6/8) shown in FIG. 13B are printed on the recording paper 71 (see FIG. 13B). Therefore, the user of the destination device can confirm that the initial transmitting source of the data for the facsimile data 63 is the transmitting source device named "AAA" and that the data has been transmitted via the facsimile device 1 named Next, the receiving history outputting process program, which is executed in the receiving history outputting process of S16, will now be described in detail with reference to FIG. 14. FIG. 14 is a flowchart illustrating steps in the receiving history outputting process program.

The receiving history outputting process program is executed to output a list of receiving history in the facsimile device 1 by using recording papers 71 each having a wireless tag 72 into which the additional data has been written as described in the facsimile receiving process program (see FIG. 15).

Hence, the receiving history outputting process program will be described on the assumption that the recording papers 71 printed with data that the facsimile device 1 has received is mounted on the document mount unit 2A of the facsimile device 1. At least one of the recording papers 71 has a wireless tag 72 storing the additional data transmitted to the facsimile device 1 by facsimile.

In the receiving history outputting process of S16, firstly, the CPU 11 determines whether a recording document has a wireless tag 72 in S51. The recording document is a one-page recording paper 71 used when creating a receiving history. The recording papers 71 mounted on the document mount unit 2A will be the recording documents one after another. If the recording document has a wireless tag 72 (S51; YES), in S52 the CPU 11 executes an additional data reading process. If the paper sheet has no wireless tags 72 (S51: NO), the CPU 11 advances to S53.

In the additional data reading process of S52, the CPU 11 causes the wireless tag reader 15 to read the additional data written in the wireless tag 72 attached to the recording document. Then, the CPU 11 stores the read additional data in the RAM 13. After storing the read additional data in the RAM 13, the CPU 11 advances to S53.

In S53 the CPU 11 determines whether all recording papers (recording documents) mounted on the document mount unit 2A have been examined for the presence or absence of a wireless tag 72 in S51 and whether the additional data has been read from the wireless tags 72 of the recording documents in S52. In other words, the CPU 11 determines no recording documents remain on the document mount unit 2A. If all recording documents have been examined (S53: YES), the CPU 11 advances to a receiving history creating process of S54. If all recording documents have not been examined (S53: NO), the CPU 11 returns to S51. Thus, new recoding document will be examined. That is, the CPU 11 can then determine whether the new recoding document has a wireless tag 72 in S52 and then perform the additional data reading process of S53.

In the receiving history creating process of S54, the CPU 11 creates receiving history data. More precisely, the CPU 11 creates the receiving history data from the additional data stored in the RAM 13 in the additional data reading process of S52.

Assume that the RAM 13 stores a plurality of sets of the additional data. In this case, the CPU 11 refers to, one by one, the receiving date and time data included in each of the additional data sets. Then, the CPU 11 rearranges the additional data sets in accordance with date and times represented by the receiving date and time data sets, creating the receiving history data composed of the additional data sets.

The CPU 11 stores the created receiving history data in the RAM 13. After storing the created receiving history data, the CPU 11 advances to a receiving history printing process of S55.

In the receiving history printing process of S55, the CPU 11 reads the receiving history data stored in the RAM 13. The CPU 11 then causes the laser printer 30 to print the list of the receiving history data on a recording paper 71 (see FIG. 15).

When the facsimile device 1 finishes executing the receiving history outputting process program, the user can confirm a detailed reception history of the facsimile data 63 (e.g., receiving date and time, number of the transmitting source, name thereof, etc.). Thus, the receiving management in accordance with the facsimile transmission can be reliably accomplished.

As described above, the facsimile device 1 according to this embodiment does not print the image based on the additional data 63b (e.g., characters representing the name and number of the transmitting source, and the receiving date and time), and can print the image based on the image data 63a on the recording paper 71. That is, the facsimile device 1 can provide "printed material not printed with the image based on the additional data" (see FIG. 10B). The facsimile device 1 is therefore very useful to the user who wants to print the received data without data for the transmitting source.

In the facsimile device 1, the received facsimile data 63 is edited before printed on the recoding paper 71 in the received data editing process of S9. If the image data contains data of the transmitting source in which corresponds to the additional data, the part of the recording paper sheet 71, where the transmitting source data may be printed, is not printed. More precisely, the facsimile device 1 performs the received data editing process of S9, thereby providing the user with "the recording paper 71 not printed with the additional data identifying the transmitting source" (see FIG. 10B).

The additional data not printed on the recording paper 71 is written into the wireless tag 72 attached to the recording paper 71. Thus, the additional data for the facsimile transmission can be read from the wireless tag 72 and can be used later, if necessary.

When the facsimile device 1 receives the facsimile data 63, the facsimile device 1 does not demand that the transmitting source device should perform any processes. In other words, the transmitting source device 60 is not requested to perform no functions other than necessary functions. Hence, the facsimile device 1 can reliably receive facsimile data from various types of transmitting source devices 60.

In the facsimile device 1, if the recording paper 71 having the wireless tag 72 is used as the copying document, and the "copy mode" is selected, the additional data stored in the wireless tag 72 is read and can be printed on the recording paper 71, together with the image data, read by the scanner 22, of the copying document. Therefore, the user can have the recording paper 71 printed with the additional data and the image data of the received facsimile data 63. That is, the facsimile device 1 can provide the user with a recording paper on which additional data sets (the number of the transmitting source, the name thereof, the receiving date and time, etc.) are printed, whenever the user wants.

In the "copy mode," if the setting item "Read Additional Data" is selected, whether the additional data is read from the wireless tag 72 and the read additional data is printed on the recording paper 71 can be set. Therefore, the user can arbitrarily set the facsimile device 1 in one mode that only the image printed on the copying document is printed, or in another mode that both the image printed on the copying document and the image for the additional data are printed. That is, the facsimile device 1 can provide convenience of "selecting a desired copy mode."

Further, in the "copy mode," the user can arbitrarily set the detail setting items "Print Position" and "Print Size," thereby printing the image for the additional data at any desired position on the recording paper and in any desired character size. Thus, the facsimile device 1 can provide printed material having data copied in a state desirable to the user. That is, the facsimile device 1 can provide convenience of "copying state in a desired state (diversity of copying state)."

If the recording paper 71 with the wireless tag 72 is the transmitting document and if the "facsimile transmission mode" is selected and executed (thereby to transmit the data for the received facsimile data 63 to any other communications device), the additional data is read from the wireless tag 72. The image based on the additional data is combined with the image acquired from the transmitting document, thus creating combined facsimile data. Accordingly, the combined facsimile data can be transmitted to any other communications device.

In the other communications device, the additional data representing the "initial transmitting source of the data for the facsimile data transmitted from the facsimile device 1" is printed on a recording paper. That is, the facsimile device 1 can inform the user of the other communications device of the "initial transmitting source of the data for the facsimile data transmitted from the facsimile device 1" (see FIG. 13A).

In the "facsimile transmission mode," if the setting item "Read Additional Data" is selected, whether the additional data is read from the wireless tag 72 and the read additional data is combined with the facsimile data 63 for the transmitting document can be determined. Therefore, the user can arbitrarily set the facsimile device 1 in one mode that the facsimile data based on the transmitting document is transmitted, or in another mode that the facsimile data 63 created by combining the image data of the transmitting document with the data for the additional data. Thus, the facsimile device 1 can provide convenience of "selecting a desired facsimile transmission mode."

Further, in the "facsimile transmission mode," if the detailed setting item "Add Own Device Data" is set, the image data acquired from the transmitting document is combined with the additional data read from the wireless tag 72 and the device data, creating a combined image data, i.e., facsimile data 63. The facsimile data 63 thus created can be transmitted to any other communication device.

In the other communication device, the additional data representing "the initial transmitting source of the data for the facsimile data transmitted from the facsimile device 1" and the device data representing "the communication route of the data for the facsimile data 63 (i.e., the transmitting source that has relayed the facsimile data 63)" are printed on the recording paper 71. That is, the facsimile device 1 can inform the user of the other communications device of the "the initial transmitting source of the data for the facsimile data transmitted from the facsimile device 1" and "the communication route of the data for the facsimile data 63 (i.e., the transmitting source that has relayed the facsimile data 63)" (see FIG. 13B).

In the facsimile device 1, if the transmitting source of the received facsimile data 63 is registered in the telephone directory data storage area 142 (S7: YES), the transmitting source name data representing the name of the transmitting source can be acquired from the telephone directory data storage area 142 and can be written into the wireless tag 72. Therefore, not only the transmitting source number, i.e., the additional data transmitted from the transmitting source, but also the transmitting source name associated with the transmitting source number is written in the wireless tag 72. The transmitting source number and the transmitting source name can therefore be read later and printed on the recording paper 71 or be used in the facsimile transmission process.

Further, in the facsimile device 1, the receiving date and time data can be acquired and written into the wireless tag 72 in the transmitting source data writing process of S6. Therefore, not only the transmitting source number, but also the detailed information for the facsimile transmission of the receiving date and time can be written into the wireless tag 72. Thus, the transmitting source number and the receiving date and time can be read later and then be printed on the recording paper 71 or used in the facsimile transmission process.

Moreover, in the facsimile device 1, the recording papers 71 each having the wireless tag 72 storing the additional data is used in "the receiving history outputting mode," thereby creating the receiving history data from the additional data sets. The created receiving history data can be printed on any other recording paper 71. The user of the facsimile device 1 can therefore confirm the receiving history. Thus, the management of the communication operation for the facsimile transmission can be appropriately accomplished.

Even if the data representing the receiving history is erased by accident, the reception history can be restored if the facsimile device 1 is operated in "the receiving history outputting mode" described above. In this respect, too, the facsimile device 1 can provide high convenience.

While the invention has been described in detail with reference to specific embodiments thereof, it would be apparent to those skilled in the art that many modifications and variations may be made therein without departing from the spirit of the invention, the scope of which is defined by the attached claims.

For example, the received data editing process of S9 is not limited to the process explained in the above embodiment. The process can be modified in various ways. For instance, the part of the facsimile data 63, which corresponds to the transmitting source data and which will be printed in the upper margin of a recording paper, may be eliminated in the received data editing process. In this case, too, the image based on the transmitting source data is not printed on the recording paper 71.

In the above embodiment, the detail setting item "Print Size" is set in "the copy mode," thus designating the size of character in which to print the additional data. Nonetheless, the facsimile device 1 may be so configured to designate not the size of characters, but the size of a printing region in which to print the image based on the additional data. In this case, the image based on the additional data is printed on the recording paper sheet 71, either magnified or reduced in accordance with the printing region size the user has set.

Further, in the embodiment described above, the receiving history data is printed on the recording paper 71 in "the receiving history outputting mode." This invention is not limited to this. For example, the receiving history data may be displayed by the LCD 18 of the facsimile device 1. Alternatively, the created receiving history data may be stored in the flash memory 14. In this case, the receiving history data stored in the flash memory 14 can be later printed on the recording paper 71 or displayed by the LCD 18. That is, once the flash memory 14 has stored the receiving history data, the reception history can be restored even if the receiving history data is erased by mistake.

What is claimed is:

1. A communication device comprising:
   a receiving unit that receives incoming data including first image data created based on a first image on a document and additional data indicating transmitting source of the first image data;
   a printing unit;
   a writing unit;
   a control unit that controls the printing unit to print on a first recording paper a second image based on the first image data and to control the writing unit to write the additional data in a wireless tag provided on the first recording paper;
   a facsimile transmitting function that transmits facsimile data through a line;
   a scanning unit that scans the second image on the first recording paper to form third image data;
   a reading unit that reads the additional data from the wireless tag;
   a transmitting unit that transmits the facsimile data to a destination device through the line;
   a facsimile setting unit that sets the facsimile transmitting function for transmitting the facsimile data;
   a first determining unit that determines whether the facsimile transmitting function is set by the facsimile setting unit;
   a device data adding unit that adds device data of the communication device to the additional data, the device data indicating transmitting source of the third image data; and
   a second determining unit that determines whether the device data is added to the additional data,
   wherein the control unit further controls the scanning unit to scan the second image on the first recording paper to form the third image data, the reading unit to read the additional data from the wireless tag, and the transmitting unit to transmit the third image data and the additional data to the destination device, if the first determining unit determines that the facsimile transmitting function is set by the facsimile setting unit and the first recording paper has the second image and the wireless tag stores the additional data, and wherein the control unit further controls the transmitting unit to transmit the additional data and the device data if the second determining unit determines that the device data is added to the additional data.

2. The communication device according to claim 1, further comprising:
a copying function that copies the second image on the first recording paper;
the scanning unit that scans the second image on the first recording paper to form second image data;
a copy setting unit that sets the copying function for copying the second image on the first recording paper; and
the first determining unit that determines whether the copying function is set by the copy setting unit,
wherein the control unit further controls the scanning unit to scan the second image on the first recording paper to form the second image data, the reading unit to read the additional data from the wireless tag, the printing unit to print on a second recording paper a third image corresponding to the first image based on the second image data and the additional image based on the additional data, if the first determining unit determines that the copying function is set by the copy setting unit and the first recording paper has the second image and the wireless tag stores the additional data.

3. The communication device according to claim 2, further comprising the second determining unit that determines whether the additional data is read from the wireless tag and the additional data is added to the second image data.

4. The communication device according to claim 3, further comprising a detail setting unit that sets a position of the additional data with respect to the second image data if the first determining unit determines that the copying function is set by the copy setting unit.

5. The communication device according to claim 4, wherein the detail setting unit sets a size of characters that represent the additional data, the characters being printed on the second recording paper if the first determining unit determines that the copying function is set by the copy setting unit.

6. The communication device according to claim 1, further comprising the second determining unit that determines whether the additional data is read from the wireless tag and the additional data is added to the third image data if the first determining unit determines that the facsimile transmitting function is set and if the first recording paper has the wireless tag.

7. The communication device according to claim 1, further comprising a data editing unit that edits, if the first image data includes source data indicating the transmitting source of the first image data, the first image data when printing a fourth image based on the edited first image data on a third recording paper so that printing of the transmitting source on the third recording paper is omitted.

8. The communication device according to claim 1, wherein the additional data includes first number data identifying the transmitting source of the first image data, the communication device further comprising:
a storing unit that stores a plurality of sets of number data identifying a plurality of destination devices and a plurality of sets of name data indicating names of the destination devices, the plurality of sets of name data being in one-to-one correspondence with the plurality of sets of number data;
a detection unit that detects the first number data included in the additional data; and
an extracting unit that extracts, if the first number data in the additional data is identical to second number data in the number data sets stored in the storing unit, first name data from the name data sets stored in the storing unit, the first name data corresponding to the second number data,
wherein the control unit further controls the writing unit to write the first name data and the additional data in the wireless tag.

9. The communication device according to claim 8, further comprising an acquiring unit that acquires communication detail data for a facsimile communication at a time of receiving the incoming data, wherein the control unit further controls the writing unit to write the communication detail data and the additional data in the wireless tag.

10. A non-transitory computer readable storage medium storing a computer-executable control program for a communication device, the communication device comprising a receiving unit that receives incoming data including first image data created based on a first image on a document and additional data indicating transmitting source of the image data; a printing unit; and a writing unit, the control program comprising instructions for:
controlling the printing unit to print on a first recording paper the second image based on the first image data;
controlling the writing unit to write the additional data in a wireless tag provided on the first recording paper;
transmitting facsimile data through a line;
scanning the second image on the first recording paper to form third image data;
reading the additional data from the wireless tag;
transmitting the facsimile data to a destination device through the line;
setting the facsimile transmitting function for transmitting the facsimile data;
determining whether the facsimile transmitting function is set by the setting step;
adding device data of the communication device to the additional data, the device data indicating transmitting source of the third image data; and
determining whether the device data is added to the additional data,
wherein the controlling step further comprises steps of controlling the scanning of the second image on the first recording paper to form the third image data, controlling the reading of the additional data from the wireless tag, and controlling the transmission of the third image data and the additional data to the destination device, if the facsimile transmitting function is determined to be set by the setting step and the first recording paper has the second image and the wireless tag stores the additional data,
wherein the controlling step further comprises steps of controlling the transmission of the additional data and the device data if the device data is determined to be added to the additional data.

11. The computer readable storage medium according to claim 10, further comprising instructions for editing, if the first image data includes source data indicating the transmitting source of the first image data, the first image data when printing a second image based on the edited first image data on a second recording paper so that printing of the transmitting source on the second recording paper is omitted.

* * * * *